United States Patent
Bader

(10) Patent No.: US 11,492,456 B1
(45) Date of Patent: Nov. 8, 2022

(54) RECOVERING HEAVY HYDROCARBONS FROM PLASTIC MATERIALS AND GEOFORMATION

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 94 days.

(21) Appl. No.: 17/300,075

(22) Filed: Mar. 2, 2021

Related U.S. Application Data

(63) Continuation-in-part of application No. 16/873,135, filed on Feb. 8, 2020, now Pat. No. 10,934,198, which is a continuation-in-part of application No. 16/501,510, filed on Apr. 20, 2019, now Pat. No. 10,577,269, which is a continuation-in-part of application No. 15/731,999, filed on Sep. 7, 2017, now Pat. No. 10,322,952, which is a continuation-in-part of application No. 15/731,637, filed on Jul. 10, 2017, now Pat. No. 10,441,898, which is a continuation-in-part of application No. 13/999,309, filed on Feb. 8, 2014, now Pat. No. 9,701,558, application No. 17/300,075, which is a (Continued)

(51) Int. Cl.

| | |
|---|---|
| *C08J 11/14* | (2006.01) |
| *B01D 17/04* | (2006.01) |
| *B29B 17/02* | (2006.01) |
| *C08J 11/28* | (2006.01) |
| *C08J 11/06* | (2006.01) |
| *B01D 69/02* | (2006.01) |
| *B01F 23/41* | (2022.01) |
| *B29B 17/00* | (2006.01) |

(52) U.S. Cl.
CPC ............ *C08J 11/14* (2013.01); *B01D 17/04* (2013.01); *B01D 69/02* (2013.01); *B01F 23/4105* (2022.01); *C08J 11/06* (2013.01); *C08J 11/28* (2013.01); *B01D 2325/20* (2013.01); *B01D 2325/38* (2013.01); *B01F 23/4145* (2022.01); *B01F 23/4146* (2022.01); *B29B 2017/001* (2013.01); *B29B 2017/0203* (2013.01); *B29B 2017/0213* (2013.01); *C08J 2327/06* (2013.01)

(58) Field of Classification Search
USPC .................................. 210/638; 516/113, 141
See application file for complete search history.

(56) References Cited

U.S. PATENT DOCUMENTS

| | | |
|---|---|---|
| 3,663,392 A | 5/1972 | Zeitler |
| 8,057,666 B2* | 11/2011 | Allan et al. ............ B01D 17/00 210/177 |
| 8,915,301 B1 | 12/2014 | Bader |

(Continued)

FOREIGN PATENT DOCUMENTS

WO    WO-2013118057 A1 *  8/2013  ............. C08J 11/28

*Primary Examiner* — Nina Bhat

(57) ABSTRACT

Sometimes, a problem is obvious, everyone sees it, but nothing happens until someone decides to do something useful about it. Methods are herein provided for recovering heavy hydrocarbons from plastic materials and/or geo-formation. In one solution set, PVC waste materials are emulsified by an amine solvent in an aqueous phase, thereby extracting heavier hydrocarbons from the primary structure of PVC into the amine aqueous phase; followed by de-emulsifying the extracted heavier hydrocarbons by separating and recovering the amine solvent, and then separating the de-emulsified heavier hydrocarbons from the aqueous phase by a hydrophobic membrane.

20 Claims, 16 Drawing Sheets

Related U.S. Application Data continuation-in-part of application No. 16/873,136, filed on Feb. 8, 2020, now Pat. No. 10,933,381, which is a continuation-in-part of application No. 16/501,595, filed on May 6, 2019, now Pat. No. 10,577,257, which is a continuation-in-part of application No. 14/998,774, filed on Feb. 13, 2016, now Pat. No. 10,280,103, which is a continuation-in-part of application No. 14/544,436, filed on Jan. 6, 2015, now Pat. No. 10,259,735, which is a continuation-in-part of application No. 14/544,317, filed on Dec. 22, 2014, now Pat. No. 10,259,734, which is a continuation-in-part of application No. 13/066,841, filed on Apr. 26, 2011, now Pat. No. 8,915,301.

(56) References Cited

U.S. PATENT DOCUMENTS

| | | |
|---|---|---|
| 9,701,558 B1 | 7/2017 | Bader |
| 10,258,920 B1 | 4/2019 | Bader |
| 10,259,734 B1 | 4/2019 | Bader |
| 10,259,735 B1 | 4/2019 | Bader |
| 10,280,103 B1 | 5/2019 | Bader |
| 10,322,952 B1 | 6/2019 | Bader |
| 10,336,638 B1 | 7/2019 | Bader |
| 10,441,898 B1 | 10/2019 | Bader |
| 10,450,202 B1 | 10/2019 | Bader |
| 10,450,212 B1 | 10/2019 | Bader |
| 10,577,257 B1 | 3/2020 | Bader |
| 10,577,269 B1 | 3/2020 | Bader |
| 10,933,381 B1 | 3/2021 | Bader |
| 10,934,198 B1 | 3/2021 | Bader |

\* cited by examiner

RECOVERING HEAVY HYDROCARBONS FROM PLASTIC MATERIALS AND GEOFORMATION

RELATED APPLICATIONS

This application is a continuation-in-part of my patent application Ser. No. 16/873,135 filed on Feb. 8, 2020, now U.S. Pat. No. 10,934,198; which is a continuation-in-part of my patent application Ser. No. 16/501,510 filed on Apr. 20, 2019, now U.S. Pat. No. 10,577,269; which is a continuation-in-part of my patent application Ser. No. 15/731,999 filed on Sep. 7, 2017, now U.S. Pat. No. 10,322,952; which is a continuation-in-part of my patent application Ser. No. 15/731,637 filed on Jul. 10, 2017, now U.S. Pat. No. 10,441,898; and which is a continuation-in-part of my patent application Ser. No. 13/999,309 filed on Feb. 8, 2014, now U.S. Pat. No. 9,701,558.

This application is also a continuation-in-part of my patent application Ser. No. 16/873,136 filed on Feb. 8, 2020, now U.S. Pat. No. 10,933,381; which is a continuation-in-part of my patent application Ser. No. 16/501,595 filed on May 6, 2019, now U.S. Pat. No. 10,577,257; which is a continuation-in-part of my patent application Ser. No. 14/998,774 filed on Feb. 13, 2016, now U.S. Pat. No. 10,280,103; which is a continuation-in-part of my patent application Ser. No. 14/544,436 filed on Jan. 6, 2015, now U.S. Pat. No. 10,259,735; which is a continuation-in-part of my patent application Ser. No. 14/544,317 filed on Dec. 22, 2014, now U.S. Pat. No. 10,259,734; and which is a continuation-in-part of my patent application Ser. No. 13/066,841 filed on Apr. 26, 2011, now U.S. Pat. No. 8,915,301.

BACKGROUND OF THE INVENTION

Plastic manufacturing is a part of petrochemical industry since it consumes about 4% of the world's annual oil production. Polyvinyl chloride (PVC) [also refers to it as poly (chloroethene)] is the third largest commodity after polyethylene (PE) and polypropylene (PP). Due to its less use of hydrocarbons, low production cost, relatively ease of processing and essentially desirable mechanical properties, PVC found extensive use in a very broad spectrum of applications. The two essential raw materials to make PVC are extracted from natural resources, saline water and crude oil. Chlorine is derived from saline water via electrolysis, and ethylene is derived from naphtha upon refining crude oil. Other less frequently used alternatives to crude oil include natural gas, bio-derived hydrocarbon feedstocks, or sugar crops.

PVC production comprises three essential steps. The first step is reacting ethylene with chlorine to produce ethylene dichloride (1, 2-dichloroethane), where the reaction may be given as follows:

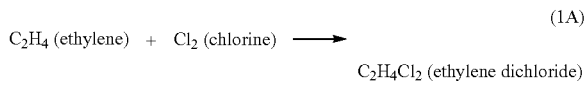

(1A)

$C_2H_4$ (ethylene) + $Cl_2$ (chlorine) $\longrightarrow$ $C_2H_4Cl_2$ (ethylene dichloride)

The second step is thermally decomposing the ethylene dichloride, thereby producing vinyl chloride monomer (VCM) and hydrogen chloride (hydrochloric acid) as follows:

(1B)

$C_2H_4Cl_2 \xrightarrow{\Delta} C_2H_3Cl$ (VCM) + HCl (hydrogen chloride)

The hydrogen chloride is then re-reacted with more ethylene in the presence of oxygen to produce more ethylene dichloride, where again the latter is thermally decomposed to produce VCM and hydrogen chloride, and again the hydrogen chloride is recycled; thereby such cyclic reactions may be simplified as follows:

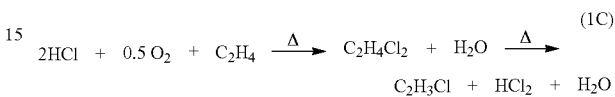

(1C)

$2HCl + 0.5\,O_2 + C_2H_4 \xrightarrow{\Delta} C_2H_4Cl_2 + H_2O \xrightarrow{\Delta}$
$C_2H_3Cl + HCl_2 + H_2O$ The overall reaction of step 1 [Eq. (1A)] and step 2 [Eqs. (1B) and (1C)] may thus be expressed as follows:

(1D)

$2C_2H_4 + Cl_2 + 0.5\,O_2 \longrightarrow 2C_2H_3Cl + H_2O$

Most plastics may be created in one of two ways: (1) chain growth polymerization; or (2) step growth polymerization (condensation). Chain growth polymerization is the typical third step in PVC production. It involves an additional reaction step to open the double bonds in VCM to allow neighboring monomers to join together; thereby forming PVC long chain homo-polymers as follows:

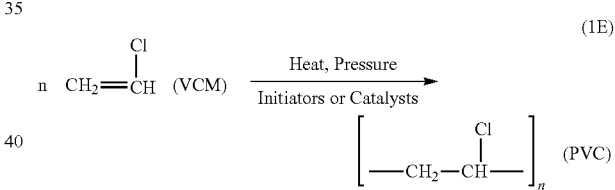

(1E)

The chain growth polymerization may be conducted in one of three ways: suspension, emulsion, or bulk. About 85% of the total PVC produced is based on suspension polymerization (an average particle size of 100-150 µm with a dense semi-permeable skin), followed by emulsion polymerization (an average particle size of about 0.2 µm), and then bulk polymerization.

FIG. 1 may depict a possible polymerization step. VCM is pressurized [increasing pressure reduces free spaces, thereby increasing the glass transition temperature ($T_g$)], liquefied and then fed into a batch or a semi-batch reactor, wherein the reactor contains in advance water (and an additive or additives). An initiator is then fed into the reactor, where the latter operates at a pressure below 7 bars and at a temperature below $T_g$ (<60° C.). Any compound that can easily decompose into free-radicals (an atom or group of atoms with at least one unpaired electron) can act as an initiator. Peroxides [ROOR] are one example, for they form radicals easily since the "—O—O—" bond dissociation energy is about 146 kJ/mol, which is lower than that for most other bonds (e.g., 243 kJ/mol for chlorine's bond dissociation energy). Oxygen is another example. The act of light (light also contains the easily broken "—O—O—" bond) to bring about radical chlorination is the act of an initiator.

Such free-radical initiators should not be confused with catalysts as the initiators are often consumed in the reaction, but they create a highly reactive and unstable condition as they break the bonds (scission) of adjacent molecules. Some initiators start the radical reaction quickly but also decay quickly, whereas others exhibit the opposite; thereby combining different types of initiators would allow uniform polymerization. PVC polymers form in the reactor as very fine particles that grow and when they reach a desirable size the reaction is terminated; water controls the heat given off in the reactor as well as forms hydrogen bonds with polymer chains, which may increase the space between the chains, thereby decreasing $T_g$; and the PVC slurry is first distilled off in gas and stream strippers to recover unreacted VCM for recycling, and then the PVC slurry is de-watered and dried.

This polymerization step that produces essentially unmodified PVC seems simple and elegant in that both waste streams (un-reacted VCM and water from the de-watering step) are reused. This same immediate reuse concept essentially goes for the first two steps as described in Paragraph [0004]. Here, the produced PVC is durable as well as chemically resistant to dilute acids and bases, salts, fats, and alcohols. This was the blessing of accidentally synthesizing PVC by Eugen Baumann in 1872.

But the thermal and photo-chemical stability of unmodified PVC is poor. Chlorine in unmodified PVC chains undergoes an autocatalytic de-chlorination by releasing hydrogen chloride under the effect of heat, sunlight, moisture, and/or oxygen; all of which are the primary elements in our atmosphere; thereby becoming brittle, chalking (shrinking and cracking), de-laminating (coatings/adhesions), and fading in color. The same elements, which are essentially intensely involved in making VCM (chlorination), are also involved (inherited) in degrading PVC (de-chlorination), but not as rapid or as intense.

Conversion of unmodified PVC is almost always pursued: (1) not only to seek out product longevity, thereby stability against heat, light and weathering; (2) but also to locate a hole in a market place for a variety of different applications. As such, a range of special additives are compounded with PVC before it can be made into products. Some of these additives are essential in all PVC formulations such as heat stabilizers; whereas some are essential in all flexible PVC formulations such as plasticizers. Other optional additives may include thermal modifiers, UV absorbers, viscosity modifiers, flame retardants, smoke suppressors, biocides, and pigments. Some of these additives overlap in their precursors as well as in their functionality.

In all PVC products, especially modified PVC products, the first important word is "exposure" (which refers to the toxicity of additives), for it causes a health risk. The second important word is "failure" (which refers to how long a product will last), for it reaches a pre-defined limit.

In as much as modified PVC is used as an "all-purpose" product in a wide variety of applications ranging from industrial materials such as construction and wire coating, through medical materials such as tubing and blood bags, to general consumable materials such as films and bags, the counter reality is that PVC is discarded as an "all-throw-away" waste. That is to say that is the curse of modifying PVC. Indeed, PVC waste (among other plastic wastes) is not only very large and diverse (in terms of additives), but is also growing at a disturbing rate and shows no signs of subsiding. Disposal of PVC waste; where many of which are discarded in landfills, and some of which may be subjected to incineration or pyrolysis; results in a number of concerns.

The life span of PVC (e.g., rigid) may be about 140 years, which takes a very long time to decompose in landfills, and which exceeds the life span of a landfill by 7-10 times. The large volume of PVC waste materials accelerates the filling up, which necessitates the need for new landfill sites and increased costs. Aside from that is the release of contaminants into our environment. The leach of PVC immediate by-products (e.g., chlorinated organic compounds), PVC additives (e.g., derivatives of heavier aliphatic carboxylic acids and aromatic phthalic acids even though the latter may not persist for a long period time due to bio-degradation, photo-degradation and anaerobic-degradation) and endocrine disruptors results in air, soil and groundwater contamination.

Combustion is a free-radical oxidation by oxygen, which results in indiscriminate decomposition of all kind of materials. The combustion of PVC waste opens the chemical routes to dioxins and furans. As such, converting waste into energy by incinerating PVC or its chlorinated liquid fuels emits such harmful substances (e.g., polychlorinated di-benzo-p-dioxins and polychlorinated di-benzo furans) along with flue gas. In addition, it generates harmful solids (chars) waste; thereby increasing the load of landfills.

Pyrolysis is a thermal free-radical decomposition of organic compounds. In staged pyrolysis-combustion, for example, the pyrolsis of PVC (e.g., 200-400° C.) in an oxygen-free reactor may suppress to a large extent the chemical routes to dioxins and furans, but releases hydrogen chloride. In the following combustion stage (e.g., 700-900° C.); wherein the fuel produced from the pyrolysis reactor is consumed in the combustion reactor, the gasified product (flue gas to heat recovery boilers) and the solidified char (to heat the pyrolysis reactor) also comprise significant amounts of chlorine; let alone not only the economic factors such as fuel consumption and low thermal efficiency, but also other environmental factors such as the produced off-gases (e.g., the release of hydrogen chloride along with harmful species within flue gas).

Recycling is essentially driven by environmental awareness, but influenced by the cost of raw materials, regulations, and the degree of recycling raw materials. The latter may be classified into different categorizes but it is directly related to the cost of raw materials and regulations. Primary recycling involves converting waste into a product of similar characteristics of the original material. But even if the primary recycling is attained, reuse of recycled PVC may not exceed seven times (e.g., significant degradation of the primary materials and/or carried over traces of toxic impurities). From this standing point of a view, it is difficult to find a balance because even if the balance is found, it often changes with the introduction of new additive variations [e.g., in respond to a current set of environmental regulations, and the new additives will more likely have a new set of environmental regulations in the future], lower cost of raw materials [e.g., a fluctuating price of crude oil and refined by-products], or different raw materials [e.g., acetylene (derived from coal) in contrast to ethylene dichloride to produce VCM, where the former opens a new route for the highly toxic mercuric chloride due to its use as a catalyst]. Producers of PVC will refrain from using, for example, recycled plastics, if the recycling is not primary as it's largely the case and/or the cost of original raw materials is low enough. If it is difficult to conduct primary recycling or reuse recycled products as raw materials, then secondary recycling may be approached by converting wastes into useful products having different characteristics.

Since PVC polymers are derived from hydrocarbons; however, tertiary recycling may involve converting PVC waste materials to produce basic fuels and/or chemicals. Alternatively, quaternary recycling may involve converting PVC waste materials to fuel (hydrocarbons) and heat (flue gas); wherein the produced fuel is consumed to produce the heat, and the heat is supplied to a power generation cycle.

THE OBJECTIVES OF THE INVENTION

Given a primary (unmodified) material, one may uniquely construct the divergence (a primary material→products). But given the divergence, one may not uniquely re-construct the primary material (the products→the primary material). The former reflects modifying the PVC primary material to create different products; thereby referring to the unity of bounding additives with the primary material. The latter reflects recycling PVC waste materials; thereby referring to the separability of bound additives from the PVC primary material. The overall objectives of this invention are to uniquely: (1) re-construct the latter; and (2) construct the former. A further objective is to uniquely re-construct the usual practice of extracting heavy hydrocarbons from geo-formation.

BRIEF SUMMARY OF THE INVENTION

This invention provides methods for recycling PVC waste materials using an amine solvent to effectively separate and recover additives from the primary structure of PVC; and/or convert the primary structure of PVC to a secondary product. The use an amine solvent is further extended to chlorinate PVC polymers and to create more effective make heat stabilizers for PVC processing. The invention also provides methods for extracting heavy hydrocarbons from geo-formation using an amine solvent without de-stabilizing the formation.

The invention is not restricted to use in connection with one particular application. It can be used, in general, to recycle thermoplastic waste materials; whether the recycling is primary, secondary, tertiary or quaternary. It can also be used for chlorinating or stabilizing thermoplastic materials to improve their qualities. It can be further used to recover hydrocarbons from geo-formation using, whether the recovery involves heating or not.

Further objects, novel features, and advantages of the subject invention will be apparent to those skilled in the art upon examining the accompanying drawings and upon reading the following description of the preferred embodiments, or may be learned by practice of the invention. Those of ordinary skills in the art will appreciate that the subject invention can be modified or adapted in a variety of ways. All such modifications or adaptions, which fall within the scope of the appended claims, are intended to be covered.

DESCRIPTION OF THE PREFERRED EMBODIMENT

Figure 1:
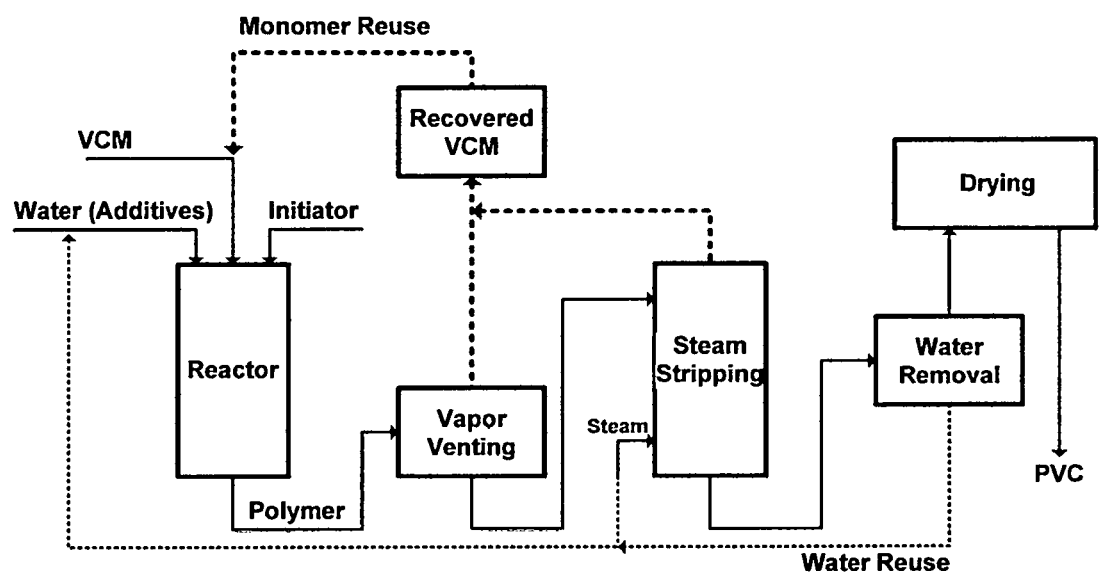
FIG. 1 illustrates a possible VCM polymerization step.

Thermo-plasticity refers to the way a plastic, once generated, responds to heat. A thermoplastic material can be heated to its melting point, cooled, and re-heated again without significant degradation. Instead of burning, it liquefies; thereby allowing it to be easily molded, and then theoretically subsequently recycled. PVC is a thermoplastic material.

An amorphous material is shapeless, which lacks the range symmetry or ordered structure; thereby gradually softening as heat is applied. In contrast, a semi-crystalline material possesses a more ordered structure and exhibit a sharp melting point; thereby transitioning from solid to liquid over a very small temperature range.

An amorphous polymer only exhibits a glass transition temperature ($T_g$) at which the polymer structure becomes viscous liquid when heated. A somewhat crystalline polymer exhibits: (1) not a sharp $T_g$ since it comprises an amorphous portion and $T_g$ is a property of an amorphous region; and (2) a melting temperature ($T_m$) range, which is above $T_g$ and a property of a crystalline region. At $T_g$, the polymer chains in the amorphous (disordered) region gain enough thermal energy to start sliding past one another. The sliding of the entire polymer chains theoretically occurs at a given temperature within the $T_m$ range (the ordered crystalline region), above which the melt becomes disordered again.

PVC homo-polymers are essentially arranged head-to-tail. This means that there are chlorines on alternating positive carbon centers, which further means that the chlorine centers are random. PVC is not entirely amorphous, but also has some crystallinity amounting to about 10%. This suffices to have some influence (some ordered) on the structure of PVC polymers.

PVC behaves different from other thermoplastic materials in that it does not have a sharp $T_m$; but having a broad: (1) melting temperature (ordered) region that may extend from 90° C. to 260° C.; and (2) degradation temperature (disordered) region that may extend between 200° C. and 400° C., where PVC starts decomposing within the upper $T_m$ range into hydrogen chloride. The latter is quantitatively related to the chlorine content of PVC, and the hydrothermal release of almost the entire hydrogen chloride occurs in the range of 350-400° C. The melting temperature (ordered) region and the degradation temperature (disordered) region may thus overlap between 200° C. and 260° C. depending on the processing history of PVC.

The molecular structure of PVC is also characterized as a plastic polymer with polarity. This polarity also distinguishes PVC from most other polymers. One is the ability to make a flexible product by adjusting elasticity and hardness; the thereby allowing the modification of PVC with plasticizers. The other one is having a somewhat larger loss coefficient; thereby absorbing microwave or electromagnetic energy.

Phthalates are the most common plasticizers used in PVC, which are diesters of phthatic acid. They are produced by reacting phthalic anhydride with alcohols. They may be classified as low- and high-molecular weights depending on the carbon numbers of alcohol. Low-molecular weight phthalates (e.g., 3 to 6 carbons) such as dibutyl phthalate (DBP) and butyl benzyl phthalate (BBP) are being phased out due to health risks (the general rule is that shorter chains increase toxicity and vice versa). High-molecular weight phthalates (e.g., 7 to 13 carbons) include diisononyl phthalate (DINP), diisodecyl phthalate (DIDP), and di-2-ethylhexyl phthalate (DEHP), where the latter is the most commonly used plasticizer (presumably less toxic).

Phthalic acid (benzene-1,2-dicarboxylic acid) is the precursor of phthalates. Phthalate and phthalic acid not only are etymologically derived from the words naphthalene and naphthenic acid, but also naphthalene is the main source of phthalic anhydride. Phthalates allow the polar PVC long chains to slide past one another by increasing the space between them; thereby acting as lubricants. The mechanism is based on the interactions between the polar centers of the phthalate (e.g., C=O functionality) and the positively charged portions of vinyl chain that essentially resides on the positive carbon atom of the carbon-chlorine bond. For this mechanism to occur, PVC is heated in the presence of a plasticizer in two temperature stages; above the $T_g$ (e.g., 82° C.), and then within the $T_m$ range. These polar-polar interactions hold upon cooling the plasticized PVC, which prevent the PVC chains from re-agglomerating, and which is unlike unmodified PVC.

Since the release of hydrogen chloride (de-chlorination) of PVC chains is the cause of stimulating, starting and sustaining degradation; whereby, in effect, releasing chlorine (the primary source of PVC thermal stability); heat stabilizers may be the most used additives to re-bond the evolved hydrogen chloride to hinder the degradation during processing. However, it seems that the premise of utilizing heat stabilizers is inverted, for it targets the effect, not the cause of the problem, which usually does not solve the problem irreversibly. Nonetheless, heat stabilizers may include the following: epoxidised soybean oil; organic tin (Sn) groups, which can be divided into a group of compounds comprising tin-oxygen bonds (carboxylates) and a group of compounds comprising tin-sulfur bonds (mercaptides), are based on different carboxylic acids in the forms of alkyl tins; and carboxylates of transition metals and/or salts (soaps) such as the stearates of lead, cadmium, barium-zinc and calcium-zinc, where lead-, cadmium-, and barium-infused heat stabilizers are either phased out voluntarily or being phased out due to health risks.

Recycling of PVC Waste

This invention preys on the parallelism with the simplicity of making PVC homo-polymers as emphasized in paragraph [0007]. The overall novelty of the invention; however, resides with uniquely re-constructing the divergence of recycling PVC waste materials as also emphasized in paragraph [0017]. In one embodiment of this invention, PVC waste materials are emulsified by an amine solvent in an aqueous phase, thereby extracting heavier hydrocarbons from the primary structure of PVC polymers into the amine aqueous phase; followed by de-emulsifying the extracted heavier hydrocarbons by separating and recovering the amine solvent, and then separating the de-emulsified heavier hydrocarbons from the aqueous phase by a hydrophobic membrane.

In another embodiment: (1) PVC waste materials are emulsified by an amine solvent in an aqueous phase, thereby extracting heavier hydrocarbons from the primary structure of PVC polymers into the amine aqueous phase; followed by de-emulsifying the extracted heavier hydrocarbons by separating and recovering the amine solvent, and then separating the de-emulsified heavier hydrocarbons from the aqueous phase by a hydrophobic membrane; and (2) de-chlorinating the restored primary structure of PVC by also an amine solvent in an aqueous phase to convert the restored PVC primary structure into a different material (polyene) by effectively releasing and yet scavenging the released hydrogen chloride from the PVC structure; and separately recovering the amine solvent and converting the scavenged hydrogen chloride into a harmless, if not useful, by-product (a water-soluble chloride salt that can also be used to produce hypochlorite, which is a chlorination source).

In this invention; whether for recycling PVC waste materials, or for modifying PVC materials, or for stabilizing PVC materials, or for recovering hydrocarbons from geo-formation; the amine solvent is selected from the group consisting of methylamine (ME), ethylamine (EA), isopropylamine (IPA), propylamine (PA), dimethylamine (DMA), diethylamine (DEA), diisopropylamine (DIPA), dipropylamine (DPA), trimethylamine (TMA), triethylamine (TEA), tripropylamine (TPA), and combinations thereof. Some of their relevant properties are presented in Table 1.

Before describing the embodiments of this invention, it is important to appraise the nature of the essential additives in PVC and the hydrothermal de-chlorination of PVC. I begin by emphasizing the similarity between: (1) the functional additives in PVC waste materials or products; and (2) the hydrothermal release of hydrogen chloride using only water and an aqueous solution of a strong inorganic base. When the similarities are recognized, can the essential differences be appreciated.

PVC Functional Additives

The functional additives used in all PVC materials include heat stabilizers, and additionally plasticizers in the case of flexible PVC materials. The functional groups used in such additives include the heavier aromatic (phthalates) and aliphatic carboxylates (naphthenates). These functional groups are essentially hydrophobic weak acid complexes derived from heavier hydrocarbons, which constitute the essential platform of additives in PVC; wherein PVC swells or dissolves in the heavier aromatic hydrocarbons (e.g., phthalates).

The content of heat stabilizers in all PVC may be within 1-5 wt %; wherein the content of inorganic cations, if any, may be within 0.1-1 wt %, depending on the processing history of PVC and its applications. However, the content of plasticizers in plasticized PVC may be within 10-60 wt %, depending also on PVC applications.

The primary structure (unmodified) of PVC is derived from hydrocarbons (e.g., naptha), where every 1 kg of PVC may yield about 0.41-0.43 kg of hydrocarbons, 0.54 kg of chlorine, and 1.9-2.0 kg of carbon dioxide. Here, the hydrocarbons can be reverted back to their lighter crude oil origin (class A) under a combination of proper temperature and pressure. Here, too, the carbon dioxide footprint is relatively small compared to any other thermally processed product, including any other plastic material. This is attributed to the less use of hydrocarbons (e.g., naptha) and more chlorine in the make-up of PVC; wherein the content of hydrocarbons is less than any other plastic material.

On the other hand, every 1 kg of heat stabilized and plasticized PVC (e.g., wire insulators) may yield about 0.24 kg of the original content of hydrocarbons in PVC, 0.36 kg of heavier aromatic and aliphatic hydrocarbons (the content of the plasticizer and stabilizer), 0.36 kg of chlorine, and 5.7 kg of carbon dioxide. Here, the reduction in the chlorine content of plasticized PVC quantitatively correlated with the reduction in the original content of hydrocarbons in PVC before stabilizing and plasticizing. Here, too, the footprint of carbon dioxide is essentially tripled, which is also quantitatively correlated with the increase in the content of heavier aromatic and aliphatic hydrocarbons through, respectively, the plasticizer and heat stabilizer. If this content of heavier hydrocarbons can be properly extracted, it can also be refilled to produce fractionated oil products, refined together with the original PVC content of hydrocarbons, or used as a direct fuel in incineration or pyrolysis, and combinations thereof.

The Hydrothermal Release of Hydrogen Chloride

Nonetheless, the release of hydrogen chloride is the obstacle in thermally processing both unmodified and plasticized PVC; whether the PVC processing involves making PVC products at higher temperatures; or converting the primary content of PVC waste materials into by-products; or refining the content of hydrocarbons from PVC waste materials; or combusting the content of hydrocarbons in waste-reduction (e.g., incineration); or waste-to-energy (e.g., staged pyrolysis-combustion). This obstacle is manifested at both ends of any sought out product by these methods; toxic air emission and toxic residue disposition. As such, effective de-chlorination is a must.

The hydrothermal release of hydrogen chloride may pre-start off at a lower temperature, which may even be within the lower temperature range of $T_m$ or slightly below it. If it occurs, this pre-star off release of hydrogen chloride as the temperature increases is rather extremely slow. However, FIG. 2A (a more of a qualitative, rather than, a quantitative figure because the reaction is time dependent) may illustrates the three stages of the hydrothermal release of hydrogen chloride. As the temperature increases, the release of hydrogen chloride increases rather very slowly in the initial stage. Near the equivalence temperature of about 275° C., the release of hydrogen chloride takes off more steeply, and then nearly levels off within the equivalence temperature of 325-400° C. (near to within the critical temperature of water). The hydrothermal release curve of hydrogen chloride as the temperature increases, in a way, resembles the titration curve of hydrogen chloride (a strong acid) with sodium hydroxide (a strong base) as the pH increases.

In an etymologic term, the word "hydrolysis" was coined using the Greek words meaning "water" and "unbind". There are three main types of hydrolysis; base, acid and salt hydrolysis. It follows that in one practical term; hydrolysis means the act of splitting a compound when water is added. In another practical term, hydrolysis means the act of binding an ion to a water molecule by splitting the water molecule. In yet a further practical term, hydrolysis means the act of forming a compound by hydrating a neutral ion or a neutral organic molecule with water.

In the hydration of inorganic ions, a cation or an anion attracts a water molecule to its immediate vicinity without cleaving the water molecule. Inorganic ions are all less electronegative than oxygen, and they have different sizes depending on their atomic numbers and ionic charges. However, inorganic cations are not solid objects with will defined limits, but they do have essentially spherical shapes; thereby occupying some space. In the hydration of an organic molecule, on the other hand, a water molecule cleaves into a proton ($H^+$) and a hydroxide anion ($OH^-$).

When an inorganic cation is hydrated, the surrounding water molecules are oriented with their negatively charged oxygen atoms pointing toward the cation, whereas their positively charged hydrogen atoms pointing away from the cation. Since cation and hydrogen ($H^+$) atoms are positively charged, they repel each other. The water molecules that are hydrating the cation are, therefore, battling two sets of opposing forces. One force is the attraction of the inorganic cation to the oxygen atom while repelling the hydrogen atom. The counter force is that the oxygen and hydrogen atoms in water are covalently bonded (e.g., held together by electrostatic interactions between their opposite charges). The rupturing of this covalent bond; the splitting of the water molecules by an inorganic cation into two, a proton ($H^+$) and an anion (OHM would result in hydrolysis. Here, the anion ($OH^-$) formed by hydrolysis would be even more strongly held by the inorganic cation, but the formed proton ($H^+$) is free to leave (a leaving cation) as influenced by repulsion between its positive charge and the positive charge of the inorganic cation. This sort of hydrolysis is a source of acidity.

Figure 2A:
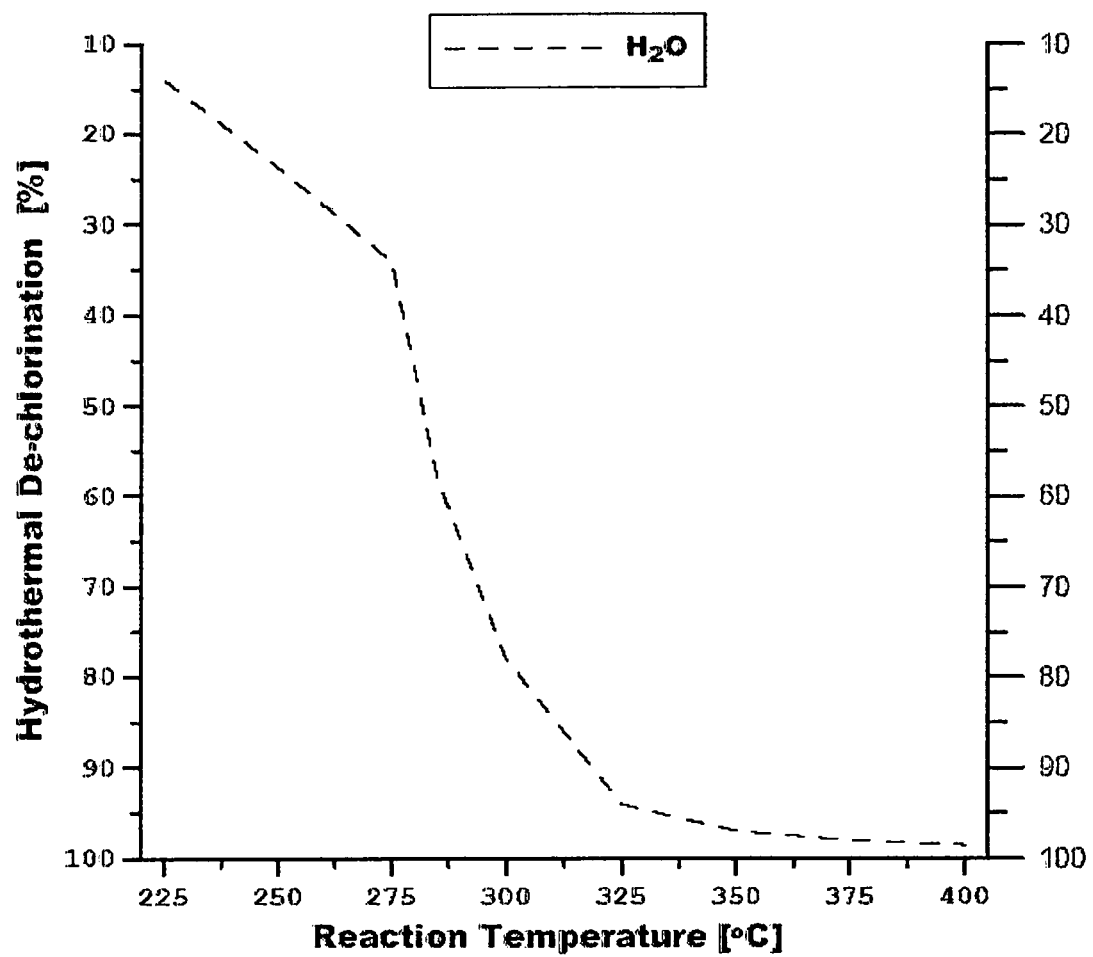
FIG. 2A illustrates the hydrothermal de-chlorination of PVC.
Figure 2B:
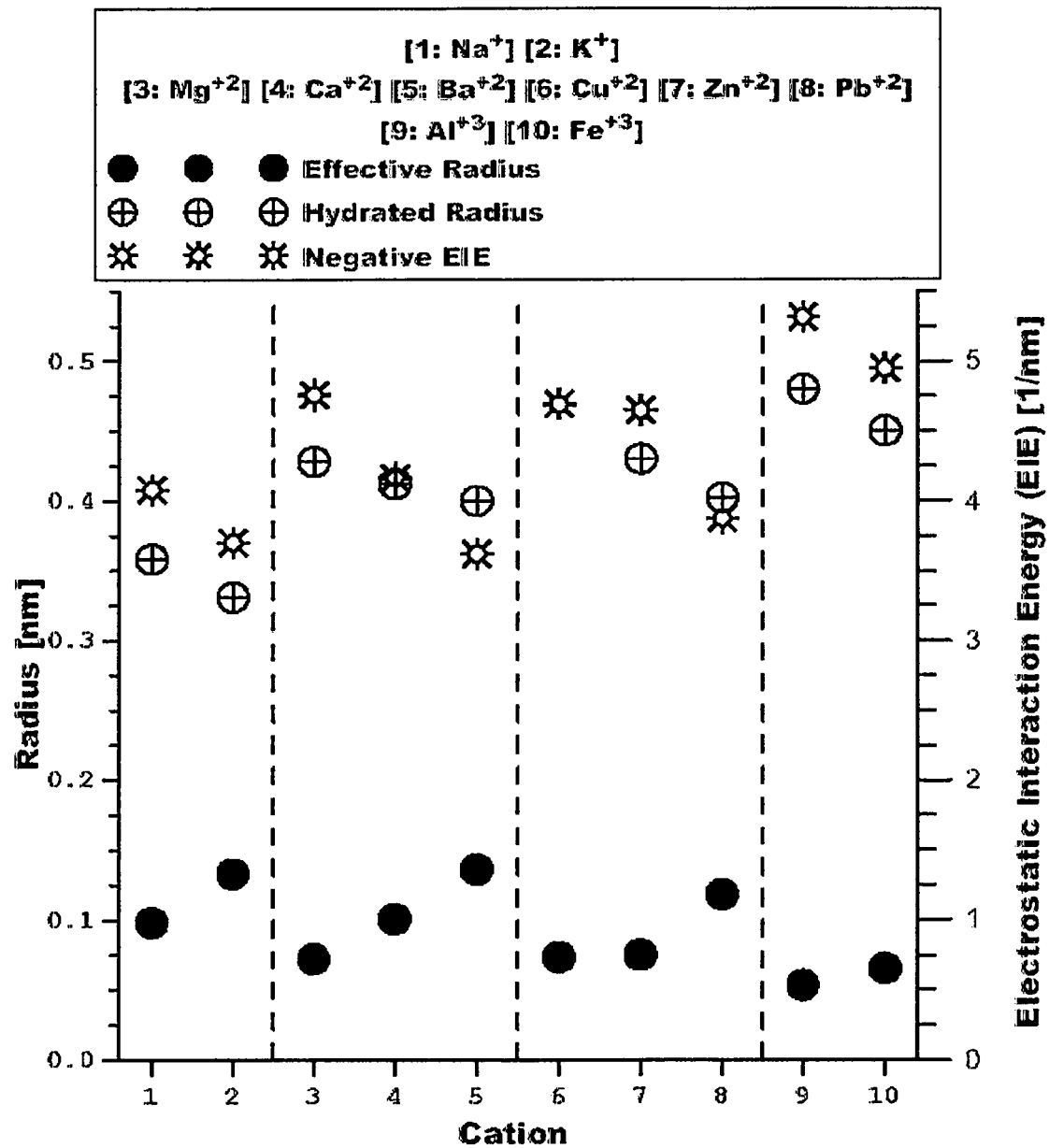
FIG. 2B illustrates the effective radii, hydrated radii, and electrostatic interaction energies of inorganic cations.

How does an inorganic cation split a water molecule? It should be noted first that the hydroxide anion is typically written as $OH^-$ to be taken to mean the negative charge is associated the molecular structure of OH, not just the "pendant H". The accurate form would be $HO^-$ or $^-OH$, but it is rarely used. The oxide (oxygen) anion, which has gained electrons compared to elemental oxygen, has an effective radius ($r_e$) of about 0.14 nm. The hydroxide anion, therefore, has a $r_e$ of about 0.11 nm [by subtracting the $r_e$ of hydrogen (0.03 nm) from the $r_e$ of oxygen], and a molar volume of 1.2 mL/mol due to electrostatic restriction. As such, the $r_e$ of hydroxide anion is less than the $r_e$ of the oxide anion, yet they are both larger than the $r_e$ of most inorganic cations that have given up electrons. The nearest oxygen atom to the hydroxide "pendant" is thus about 0.25 nm (by summing the radii of oxygen and the hydroxide), which is nearly twice the distance as in the oxide or hydroxide anions accepting hydrogen bonds (0.14 nm), and which is also outside the typical hydrogen bond signature distance (0.15-0.21 nm). Since oxide or hydroxide is an anion, it is strongly attracted to inorganic cations by electrostatic interactions. The latter are inversely proportional to the distance of oxide- or hydroxide-inorganic cation (the sum of the oxygen and inorganic cation effective radii). It follows that for a given class of cationic charges (e.g., monovalent, divalent, trivalent, etc.), an inorganic cation with a smaller $r_e$ will interact more favorably with oxygen (oxide or hydroxide) than a larger inorganic cation because oxygen can get closer to the cationic charge. In other words, an inorganic cation with a smaller $r_e$ for a given cationic charge class will have a shorter distance from oxygen than that of a large inorganic cation; thereby having a more negative electrostatic interaction energy (EIE) than that of a large inorganic cation. The hydration radius ($r_h$) of an inorganic cation also depends on the EIE of water molecules to that cation; where a cation with a smaller $r_e$ attracts more water molecules; thereby having a higher $r_h$ than that of a large inorganic cation. FIG. 2B shows the inverse relationships between $r_e$ [effective (non-hydrated) radii] on the one hand; and the negative EIE and $r_h$ (hydrated radii) of inorganic cations, on the other hand.

The negative EIE trends can be more observable in the free energy of hydration ($\Delta G_H$) or solvation ($\Delta G_S$) since electrostatic interactions dominate all the overall free energies, where the latter are thermodynamic properties, and $\Delta G_S$ is more explicit with reference to the negative logarithm of the aqueous phase acid dissociation constant ($pK_a$). Such trends can be made even more clearly observable, if one follows the assumption that most ions are spherical, by relating $r_e$ to volume ($V_i$) and then taking the inverse cubic root of $V_i$ (1/nm) as an essentially linear function, which may be expressed as follows:

$$V_i^{-1/3} = \left[\frac{4\Pi r_e^3}{3}\right]^{-1/3} \quad (2A)$$

Figure 2C:
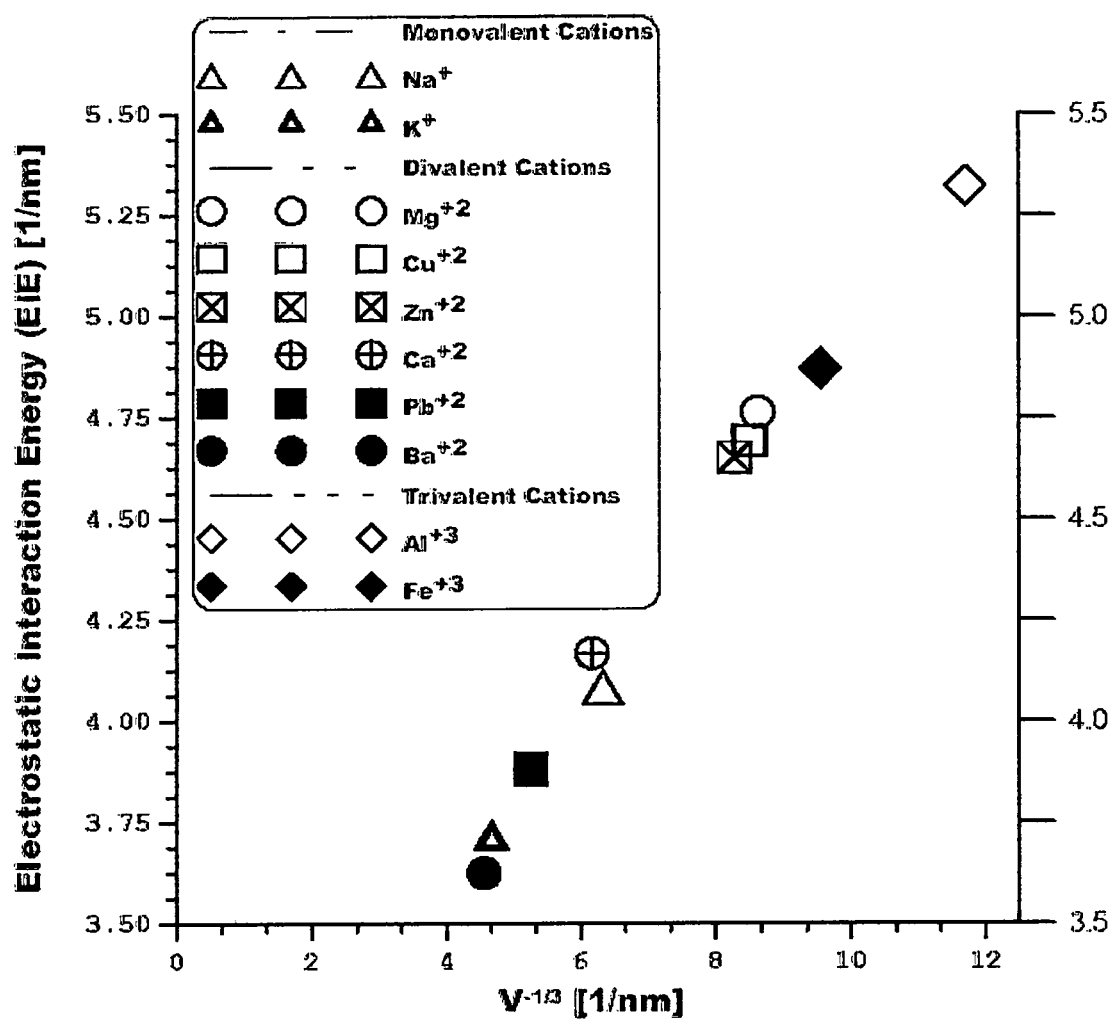
FIG. 2C illustrates the inverse cubic root of volumes versus the electrostatic interaction energies of inorganic cations.
Figure 2D:
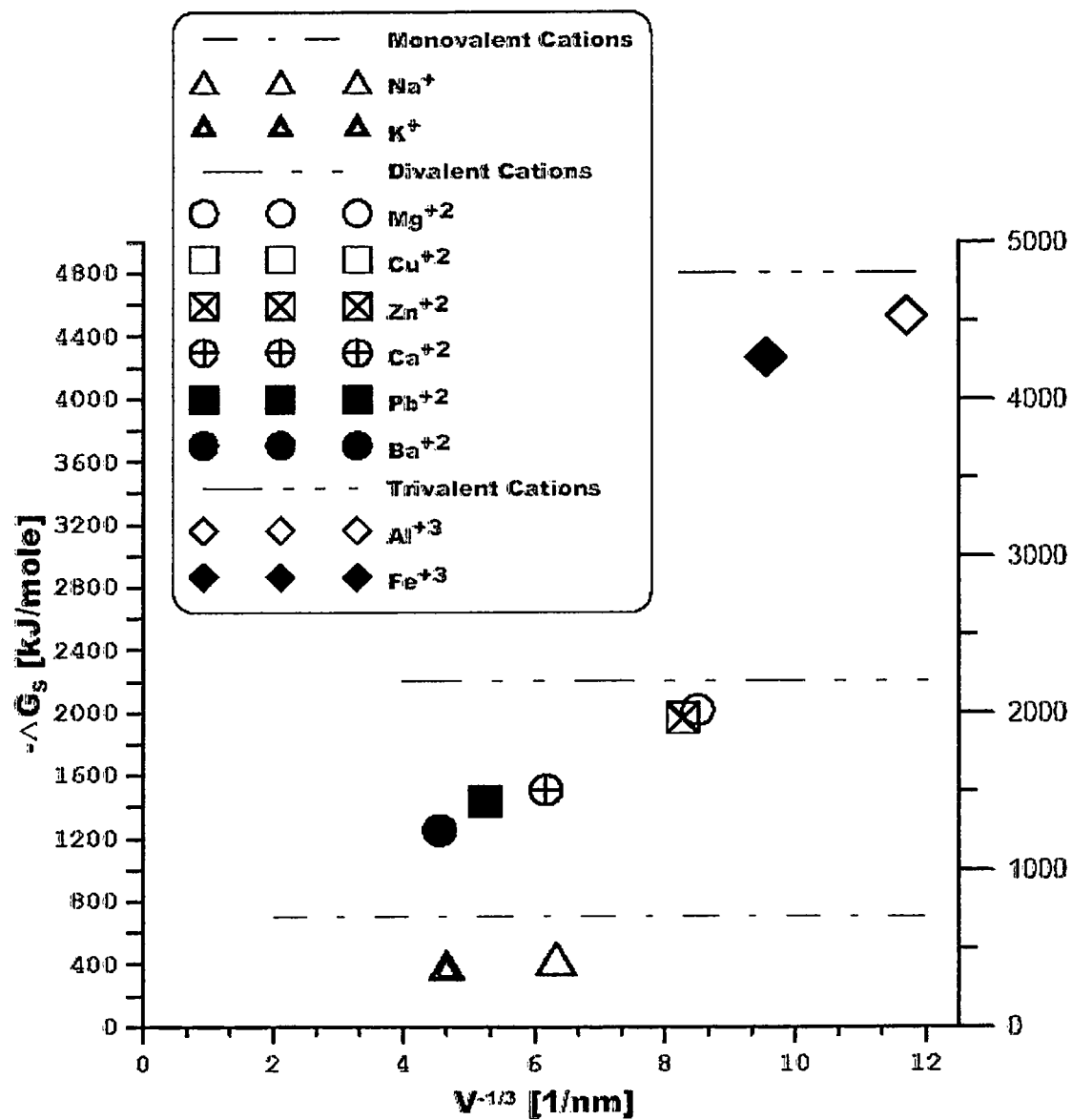
FIG. 2D illustrates the inverse cubic root of volumes versus the solvation free energies of inorganic cations.
Figure 2E:
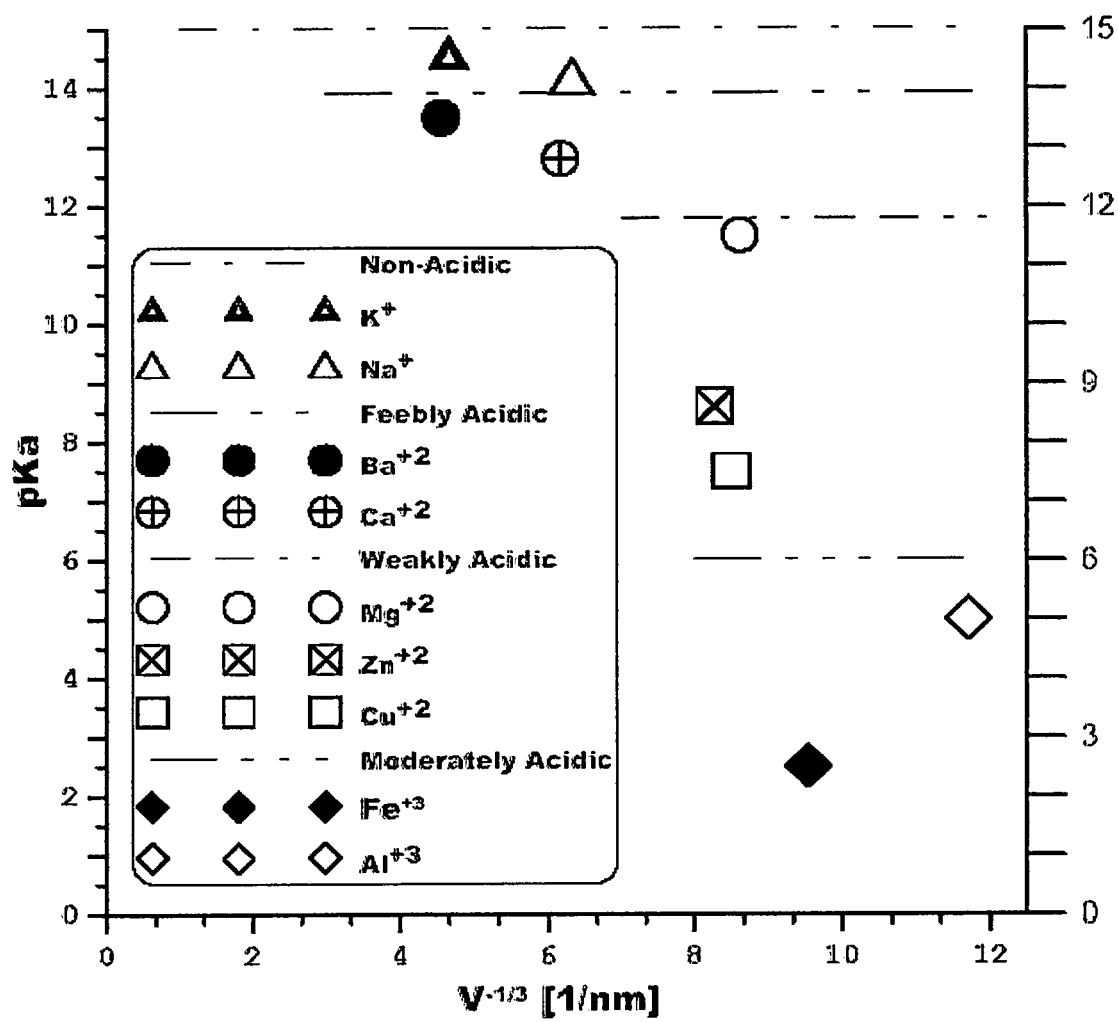
FIG. 2E illustrates the inverse cubic root of volumes versus the logarithm acid dissociation constants of inorganic cations.

The linearized trends of the EIE, $\Delta G_S$ and $pK_a$ are shown, respectively, in FIGS. 2C through 2E. These figures clearly indicate that the smaller $r_e$ (the larger $V_i^{-1/3}$) and the higher charge of an inorganic cation, the higher are the EIE (stronger interactions between the inorganic cation and oxygen (oxide or hydroxide anions); the thereby higher the $\Delta G_S$ (the harder to break the binding), and the lower the $pK_a$ (the more leaving $H^+$ protons).

How come hydrolysis is a source of acidity? The hydrolysis reaction of a water molecule by an inorganic cation may be expressed as follows:

(2B)

where X is an inorganic cation and z is it's positive charge. This initial hydrolysis reaction is defined by the first equilibrium acidity constant ($K_a$), which may be expressed as follows:

$$K_a = \frac{[X(OH)^{z-1}][H^+]}{X^z} \quad (2C)$$

By rearranging Eq. (2C), the pH of this hydrolysis reaction can be expressed in terms of the first $pK_a$ as follows:

$$pH = pK_a + \log\frac{[X(OH)^{z-1}]}{X^z} \quad (2D)$$

As such, the hydrolysis reaction is pH-dependent, and the first $pK_a$ is the pH at which the initial hydrolysis reaction has proceeded halfway to completion. As shown in FIG. 2E, inorganic cations differ considerably in their tendency to cause hydrolysis; wherein the higher the charge of an inorganic cation, the lower the first $pK_a$ for the cation, the thereby more likely the cation induces hydrolysis.

Basicity is the relative strength of a molecule of an agent to accept a proton in an acid-base reaction. Nucleophilicity is the relative strength of an agent to cause a substitution reaction. However, a stronger base is usually a better nucleophile than a weaker base; thereby nucleophiles parallel basicity when comparing ions or atoms of the same group. When the nucleophilic ions or atoms are different, nucleophilicities may not parallel basicities; instead, parallel size when comparing ions or atoms.

A carbon-chlorine bond is polar, and the chlorinated carbon in PVC has a partial positive charge (the positive carbon). This carbon is particularly susceptible not only to attack by heat, but also to attack by an anion or any other species that carries an unshared pair of electrons in the outer shell. The result is a substitution reaction; a reaction in which one atom, ion, or group is substituted for another. When it is treated with a base, an elimination reaction can also occur; a reaction in which a molecule loses atoms or ions from its structure. A hydroxide anion can react as a nucleophile ("nucleus lover") in a substitution reaction, or as a base in an elimination reaction. Which type of reaction actually occurs, dominates, or competes with the other, depends on the temperature, the strength of the base, and the nature of the solvent if the base is water or an organic.

Vinylic chlorides are generally unreactive in both types of substitution reactions due to unreactiveness for the $S_N2$ substitution reaction and instability for the $S_N1$ substitution reaction. Increasing temperature generally favors both types of elimination reactions (E2 and E1), but the E2 elimination reaction is the bimolecular reaction of vinylic chlorides. One de-chlorination method is the hydrothermal (heat and water) release of hydrogen chloride. As noted earlier, it may proceed in three stages (FIG. 2A). The release of hydrogen chloride simultaneously transforms PVC chains into conjugated polyene sequences as the temperature increases. Because of the neutral polar water molecule, water act as a nucleophile; and because of the hydroxide anion in water, water can also act as a weak base. At high temperatures (>400° C.), this transformation, reaches the point of decomposing polyene and conjugates to residual chars.

Here, the term "neutral" refers strictly to acid-base properties. A neural inorganic ion does not react with water to produce $H^+$ and $OH^-$ ions, thereby not affecting the pH. A neutral inorganic anion is typically derived from a strong acid. A typical neutral inorganic anion is the chloride ion, which is produced by the complete dissociation of the hydrogen chloride (hydrochloric acid) as a strong acid in water:

(2E)

There is no tendency for this reaction to be reversed. As such, chloride anions, regardless of their source, do not combine with $H^+$ ions, which do not change the $[H^+]$ in Eq. (2C); thereby do not change the pH of water [Eq. (2D)].

The same applies to neutral inorganic cations (e.g., $Na^+$, $K^+$, $K^+$, $Ca^{+2}$, and $Ba^{+2}$). The sodium cation, for example, is produced by the complete dissociation of the sodium hydroxide as a strong (non-acidic) base in water:

(2F)

Here, too, there is no tendency for the reverse reaction to occur. As such, the neutral sodium cations, wherever they come from, do not combine with $OH^-$ ions. One essential reason is that because the Na—OH distance is 0.245 nm, which is outside the normal hydrogen distance (0.15-0.21 nm); thereby the sodium cation cannot hold $OH^-$ anion (e.g., Paragraph [0059]). The same essentially goes for the rest of such neutral inorganic cations (e.g., $K^+$, $Ca^{+2}$, and $Ba^{+2}$); where their X—OH distances range from 0.24 nm ($Ca^{+2}$) to within 0.27-0.28 nm ($K^+$ and $Ba^{+2}$).

When a strong acid (e.g., hydrogen chloride) reacts with a strong base (e.g., sodium hydroxide), which both completely dissociated in water into ions, the reaction involves the $H^+$ ion of the hydrogen chloride and the $OH^-$ ion of the sodium hydroxide. The net neutralization reaction is as follows:

(2G)

Here, the spectator ions (the neutral chloride anion of the hydrogen chloride and the neutral sodium cation of the sodium hydroxide) do not take part in the reaction, and their salt (sodium chloride) is water-soluble. Upon reacting (say titrating) hydrogen chloride with sodium hydroxide at different concentrations, the increase in the pH starts off rather slowly until near the equivalent point [the neutralization point at nearly equal amounts of $H^+$ and $OH^-$ ions; Eq. (2G)], after which the pH takes off more steeply, and then nearly levels off as excess sodium hydroxide is added. The $pK_a$ of $OH^-$ is about 15.7, which means the equivalent point for a full strength $OH^-$ is at a pH of about 7.85, where the initial hydrolysis reaction has proceeded halfway to completion. This reaction (as the pH increases with the increase in sodium hydroxide concentration) resembles the release of hydrogen chloride from PVC as the temperature rises (FIG. 2A). What will happen beyond the initial hydrolysis reaction point (the neutralization point in the case of titration)?

It is known that all hydrochlorocarbon as well as all hydroflurocarbon polymers [U.S. Pat. Nos. 10,934,198 and 10,933,381] to be vulnerable to the hydroxide of a strong inorganic base such as sodium hydroxide or other strong bases because both the nucleophilic substitution reaction and the elimination reaction take place in PVC as, respectively, follows:

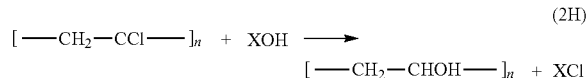
(2H)

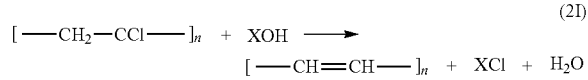
(2I)

where X is an inorganic cation (e.g., $Na^+$, $K^+$, or the like) of strong inorganic bases. The full strength hydroxide anions of sodium hydroxide, for example, act as strong denaturants; which maximizes the disruption of intra-molecular non-covalent interactions of PVC backbone; wherein the $S_N 2$ substitution reaction [Eq. (2H)] may be marginal but still takes place, whereas the E2 elimination reaction [Eq. (2I)] is dominant once the release of hydrogen chloride reaches a high level. Yet, the full strength of hydroxide anions simultaneously suppresses, to some extent, the hydrothermal release of hydrogen chloride. The main reason for this suppression of hydrogen chloride is that the complete dissociation of sodium hydroxide in water produces the neutral sodium cation and the full strength $OH^-$ anion; wherein the $OH^-$ anion can act both as a nucleophile to promote (to some extent) the substitution reaction, and as a strong base to proceed with the elimination reaction; and wherein the $r_e$ and $r_h$ of the $OH^-$ anion are, respectively, 0.11 nm and 0.245 nm (the $r_h$ of $OH^-$ is equal to the Na—OH distance); which are small enough neither to create sufficient pore spaces, nor to cause larger pore sizes, nor to induce swelling on the surface or within the structure PVC chains. It can be said that the effects of the hydrothermal de-chlorination using an aqueous solution of a strong inorganic base are more degrading to the primary structure of PVC chains and less de-chlorinating than the effects of the hydrothermal de-chlorination using only water.

In the primary recycling of PVC waste materials, where specific selective separation of functional additives (e.g., plasticizers and/or heat stabilizers) from the primary structure of PVC chains within the lower $T_m$ range is essential prior to any further step, the combine effects of heat and use of such strong denaturants indicate the generation of conjugated polyene sequences, which interferes with the essential purpose of this specific selective separation.

In the secondary, tertiary, or quaternary recycling, where PVC waste materials requires further de-chlorination within the upper $T_m$ range and/or beyond, neither the hydrothermal de-chlorination using an aqueous solution of a strong inorganic base (e.g., the hydroxide of sodium or potassium), nor the hydrothermal de-chlorination using only water suffices to effectively de-chlorinate PVC materials without extensive reaction temperature.

The Amine Solvents

The selected amine solvents are neutral polar organic molecules. They are weak bases because they do not furnish $OH^-$ anions directly by dissociation in water (e.g., unlike a strong base such as sodium hydroxide), but they pick up a proton ($H^+$) from a water molecule to form a protanated amine as a monovalent cation. The hydration of an amine solvent occurs by cleaving the water molecule. As such, the molecular $OH^-$ anion is formed by the loss of a proton from a water molecule. IPA, for example, reversibly reacts with water as follows:

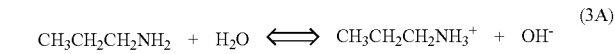
(3A)

Here, the forward reaction occurs to only a slight extent. For example, in a 0.1 M aqueous solution of IPA, nearly 99% (0.099 M) of IPA ($CH_3CH_2CH_2NH_2$) molecules remain unreacted, whereas the concentrations of $CH_3CH_2CH_2NH_3^+$ and $OH^-$ are only about 1% (0.001 M). By adding a $H^+$ proton to IPA, the conjugated weak acid is formed. Thus, the products are a weak acid ($CH_3CH_2CH_2NH_3^+$) and an $OH^-$ anion; wherein the anion is, to some extent, free to leave (a partially leaving anion); which also, to some extent, makes the aqueous solution basic.

Figure 3A:
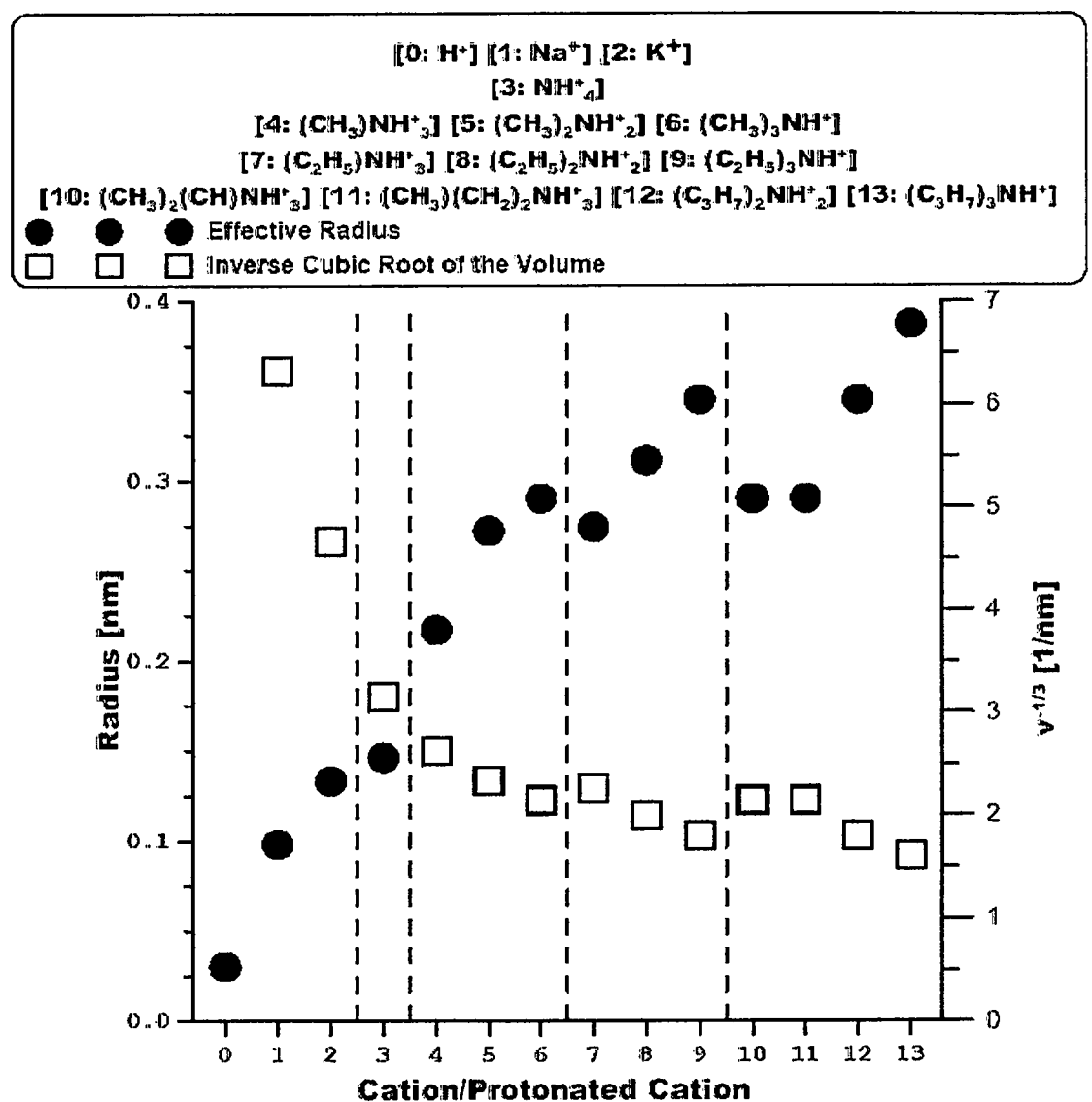
FIG. 3A illustrates the effective radii and inverse cubic root of volumes of inorganic cations and protonated amines.
Figure 3B:
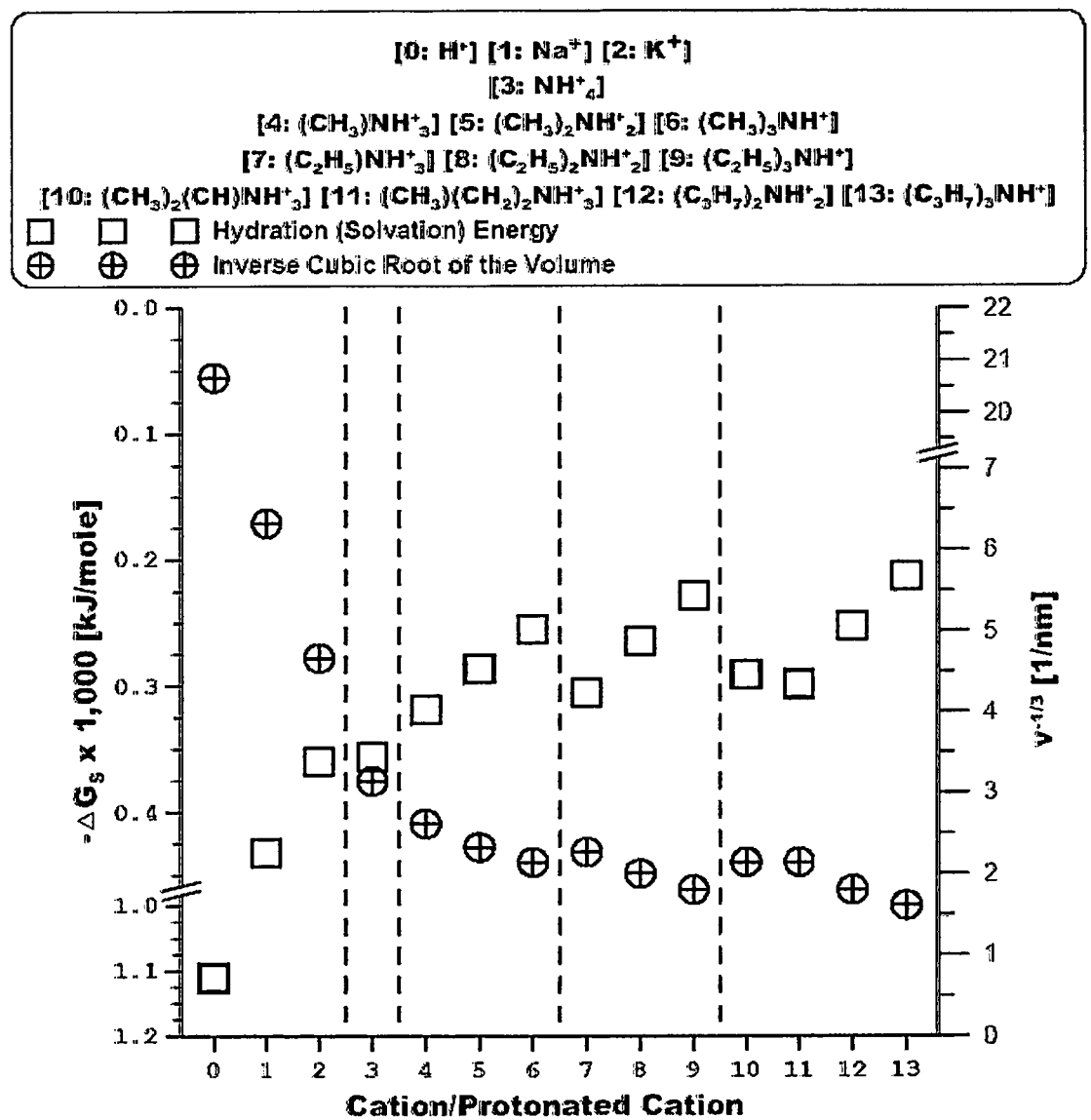
FIG. 3B illustrates the solvation free energies and inverse cubic root of volumes of inorganic cations and protonated amines.
Figure 3C:
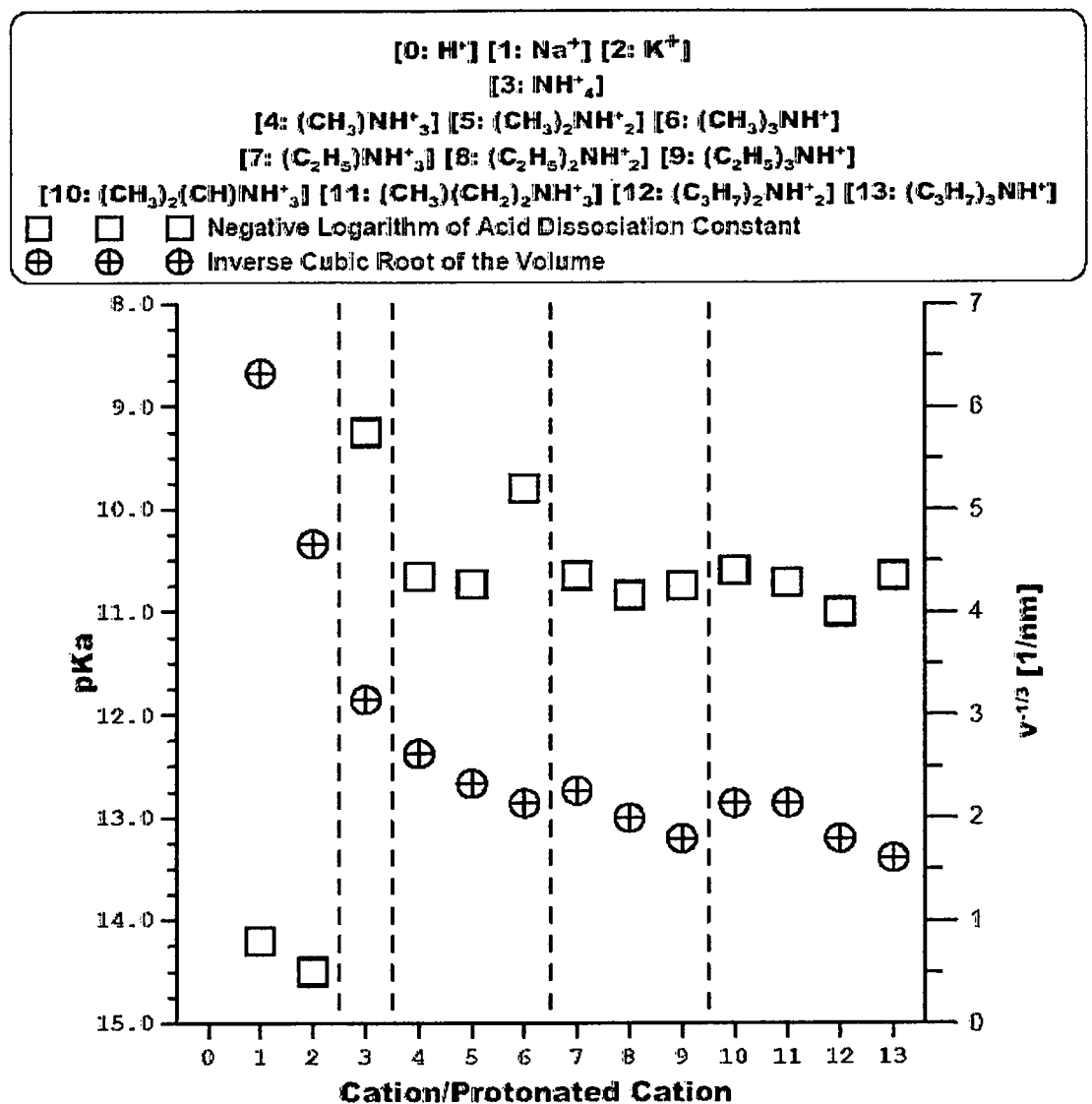
FIG. 3C illustrates the logarithm acid dissociation constants and inverse cubic root of volumes of inorganic cations and protonated amines.

The behavior of such amine solvents as opposed to the behavior of sodium hydroxide (or the like of strong bases) is that sodium hydroxide completely dissociates in water to produce the neutral sodium cation and the full strength denaturant hydroxide anion to freely roam around because the Na—OH distance is slightly outside the normal hydrogen distance; thereby the hydroxide anion is not held to the neutral sodium cation. Here, the hydrolysis of sodium hydroxide is practically the act of completely separating the neutral sodium cation from the hydroxide anion when water is added. FIG. 3A shows that $r_e$ of the protonated amine solvents are larger (by 2 to 4 times) than the $r_e$ of the neutral sodium or potassium cation (thereby the $V_i^{-1/3}$ of the protonated amine solvents are proportionally smaller than the $V_i^{-1/3}$ of the sodium and potassium cation). It follows, as shown in FIG. 3B, that the $\Delta G_S$ of the protonated amine solvents are smaller than the $\Delta G_S$ of the sodium or potassium cation. Yet, FIG. 3C shows that the $pK_a$ of the protonated amine solvents (weakly acidic) are lower than the $pK_a$ of the sodium and potassium cations (non-acidic), even though the $r_e$ of the latter are smaller than the estimated $r_e$ of the protonated amine solvents.

On the other hand, the behavior of such protonated amine solvents is opposite to the behavior of most inorganic divalent and trivalent cations (e.g., $Mg^{+2}$, $Cu^{+2}$, $Zn^{+2}$, $Al^{+3}$ and $Fe^{+3}$). The X—OH distances of the divalent and trivalent cations range from 0.19 nm ($Al^{+3}$) to 0.21 nm ($Mg^{+2}$), and since such distances fall within the normal hydrogen distance, the hydroxide anion is strongly bonded to such cations, whereas the proton ($H^+$) is free to leave. Here, the hydrolysis of such acidic inorganic divalent and trivalent cations is practically the act of binding an acidic inorganic cation to a hydroxide anion of a water molecule by splitting the water molecule. As such, the acidity (e.g., $pK_a$) of such cations is categorized as weakly acidic (e.g., $Mg^{+2}$, $Cu^{+2}$ and $Zn^{+2}$) and moderately acidic (e.g., $Al^{+3}$ and $Fe^{+3}$) on the basis of their charges and $r_e$.

In contrast, the selected amine solvents neither completely dissociate $OH^-$ anions as is the case with monvalent cations in the form of strong bases (e.g., sodium hydroxide); nor do freely dissociate $H^+$ protons but strongly hold $OH^-$ anions of water molecules as is the case with most divalent and trivalent cations. Yet, the $pK_a$ of the protonated amine solvents, as lumped together for clarity and shown in FIG. 2E, are within the $pK_a$ of divalent cations (weakly acidic); even though the amine solvents bind, rather than, dissociate $H^+$ protons (unlike most divalent and trivalent cations); and even though the $r_e$ of the protonated amine solvents are much larger than almost all inorganic cations including monovalent cations.

Recall that hydrogen chloride is a strong acid and the selected amine solvents are weak bases. This strong acid (hydrogen chloride)-weak base (e.g., IPA) reaction can be expressed as follows:

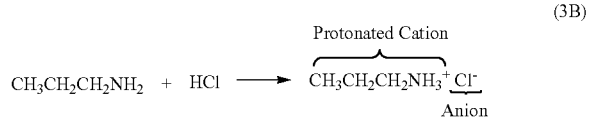
(3B)

Such amine solvents act as direct scavengers for hydrogen chloride as a whole; not either/or (e.g., either the hydrogen cation or the chloride anion).

Di-2-ethylhexyl phthalate (DEHP) is the plasticizer most often used in flexible PVC, although other plasticizers may alternatively be used. The emulsification of DEHP by IPA, for example, at a temperature slightly below or within the lower $T_m$ range of PVC chains leads to the transformation of DEHP into the phthalate anion in the form of IPA, and 2-ethyl-1-hexanol. This emulsification step may be expressed as follows:

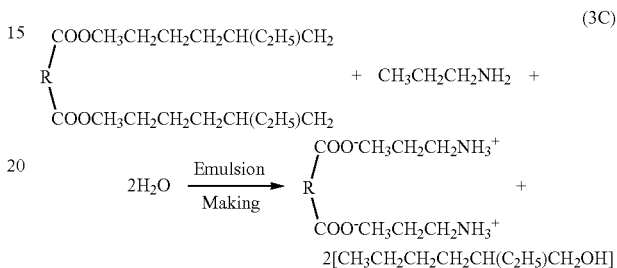
(3C)

Here, the amine solvent (e.g., IPA) emulsifies the DEHP (emulsion making). Since IPA is miscible in water whereas the phthalate is insoluble in water, the amine-phthalate complex migrates, along with the sparingly water soluble 2-ethyl-1-hexanol, to the aqueous phase.

Upon driving (stripping) off the amine solvent (e.g., IPA) from the water phase by an inert stripping gas such as nitrogen or low grade water vapor, IPA is released from the amine-phthalate complex, thereby breaking (de-emulsifying) the emulsion and releasing the sparingly water soluble phthalic acid to the aqueous phase. This may be simplified as follows:

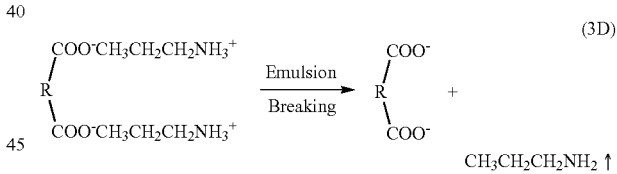
(3D)

As mentioned earlier, the content of a plasticizer in plasticized PVC may be in the range of 10-60 wt %, which the largest content of any additive used in PVC; thereby using an amine solvent can effectively de-emulsify the heavier aromatic hydrocarbons content from flexible PVC waste materials.

The same emulsification and de-emulsification steps by an amine solvent essentially apply for other phthalates in alternative plasticizers including the high-molecular weight phthalates such as diisononyl phthalate (DINP) and diisodecyl phthalate (DIDP) as well as the low-molecular weight phthalates such as dibutyl phthalate (DBP) and butyl benzyl phthalate (BBP).

Heat stabilizers may be used in all PVC products. However, epoxidized soybean oil (ESBO) may be the most often used heat stabilizer (also serves as a lubricator and a plasticizer), even though other available heat stabilizers may alternatively be used. The content of ESBO in PVC may be within 3.5 wt %. Soybean oil, itself, may comprise 16 wt % of saturated carboxylic acids [stearic (C-18) and palmitic (C-16) acids)], 23 wt % of monounsaturated carboxylic acids [oleic acid (C-18)]; and 58 wt % of polyunsaturated carboxylic acids [α-linolenic and linolenic acids (C-18)]. These heavier aliphatic weak carboxylic acids are nearly completely insoluble in water. Epoxidation may involve reacting soybean oil with a peroxide or peracid source to add an oxygen atom to the polyunsaturated carboxylic acids of soybean oil, which have high number of carbon-carbon double bonds; thereby converting such double bonds to an epoxide group. The latter is more reactive than the double bonds of polyunsaturated carboxylic acids, which for the purpose of binding hydrogen chloride provides more reactive sites. Since ESBO is not chemically bonded to PVC chains and the radical epoxide group may be consumed, terminated or dissipated in discarded PVC waste materials (due to a low "HOOH" bond dissociation energy of about 146 kJ/mole), the essential content of the heat stabilizer in all PVC is such saturated and unsaturated, mono and ploy, aliphatic carboxylic acids (C16-C18). The emulsification and de-emulsification steps of such heavier aliphatic hydrocarbons by an amine solvent (e.g., IPA) in a water phase are essentially similar to the emulsification and de-emulsification steps of the heavier aromatic hydrocarbons (the main content of the plasticizer in flexible PVC), which may be expressed, respectively, as follows:

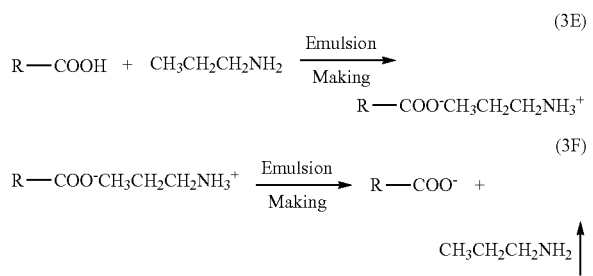

PVC possesses an asymmetric polarity and a somewhat larger dielectric tangent (a loss coefficient). The former means dielectrics move around (alternate) while diploes facing the direction of an electric field. The latter means absorbing, rather passing through, microwave or electromagnetic heat. Conventional heating methods tend to overheat the outermost surface of PVC polymers to compensate for the heat loss through the macro-molecular (thicker) polymers in order to reach the innermost sides of the polymers (heating from outside to inside). On the other hand, microwave heating, owing to these two characteristics of PVC, can be used to nearly uniformly heat the PVC chains from the inside out without overheating the surface of PVC chains and the walls of a reactor. In other words, it is a directional heating from inside to outside via intense vibration, rotation and friction; thereby no unnecessary overheating and no heat escaping outside. Aside from gent effective heating, there are many reasons for using microwave heating in a fluidized reactor; including: (1) selective heating to enhance polymers' mobility and reactivity; (2) fast heating with very high temperature capabilities (if required); (3) low cost, compactness, flexibility, portability, and maintainability; (4) using a cleaner energy source and operation cost savings; and (5) a remote control capability to avoid higher frequency.

The de-emulsification step requires effective separation for the heavier aromatic and/or aliphatic hydrocarbons (essentially heavy oil) phase from the water phase. A hydrophobic membrane allows the oil phase to pass through the membrane while rejecting the water phase. Such a hydrophobic membrane can provide quality heavy oil-water phase separation.

In both cases (the heavier aromatic and aliphatic hydrocarbons), the polar-polar interactions between the functional groups of the plasticizer and/or the heat stabilizer on the one hand, and the hosting PVC polymers on the other hand, are rather weakly bind (compounded) because they are not chemically bonded. The amine solvent interacts with such negatively charged functional groups with high affinity to form amine-weak acid complexes; thereby providing high selectivity over the non-acidic, positively charged, polar structure of PVC polymers. This invention, therefore, resides with using an amine solvent as gentle mean (not a strong denaturant) to emulsify heavier hydrocarbon additives from PVC polymers; in a combination with, preferably but not necessarily, gentle heat, to release such not chemically bonded functional groups from their hosting PVC polymers; and further in a combination with a hydrophobic membrane (after the de-emulsification step) to separate the heavier aromatic and aliphatic hydrocarbons (the heavy oil phase) from the aqueous phase.

Figure 3D:
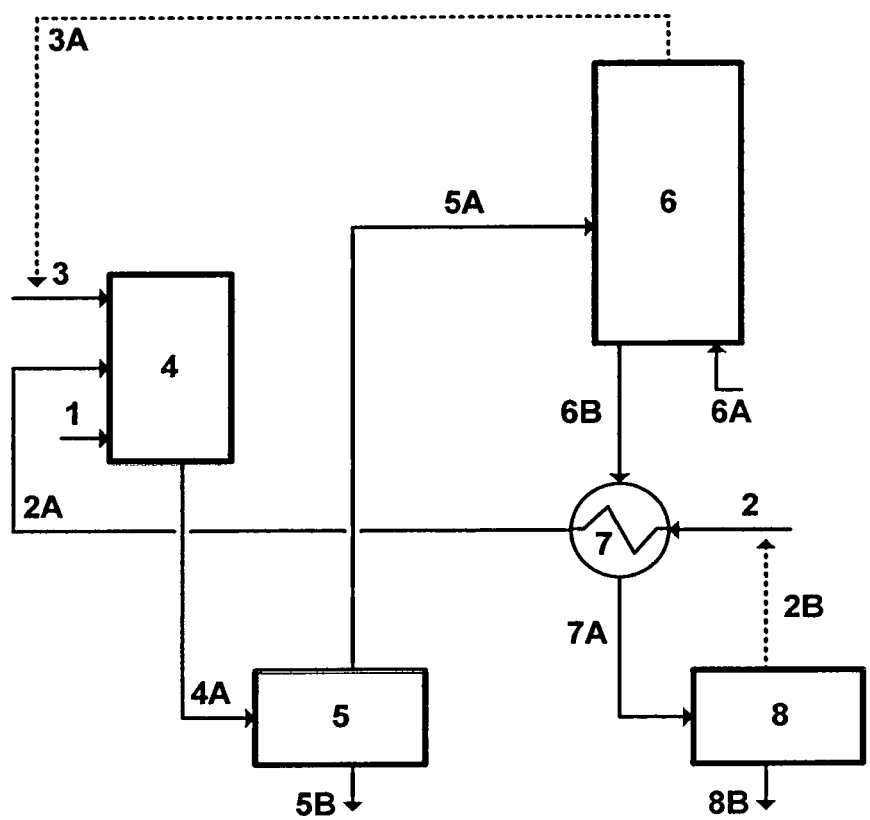
FIG. 3D illustrates a possible flow diagram for the emulsification and de-emulsification step of PVC waste materials.

FIG. 3D depicts the emulsification and de-emulsification embodiment of this invention. A grounded or shredded PVC waste material [1] comprising a plasticizer and/or a heat stabilizer is hydrated by a pre-heated water stream [2A] in an emulsification reactor [4], and emulsified by an amine solvent [3]; thereby producing a first oil-in-water emulsion [4A]. Here, the oil-to-water ratio may be between 20/80 and 75/25 to avoid yielding a water-in-oil emulsion; where the latter could abruptly appreciably increase the viscosity of the emulsion, which is undesirable. The molar concentration ratio ($M_r$) of the amine solvent to the hydrated PVC content may be within 0.02 to 2 range, depending on the content of the plasticizer and/or the heat stabilizer in the PVC waste material as well as the selected temperature of the emulsification reactor [4]. A higher or a lower $M_r$ can also be used as needed. The reaction temperature of the emulsification reactor [4] may be about the $T_g$ of PVC (90° C.) to about 200° C. The reaction temperature may also depend on the heating source; wherein the heating source may be microwave heating or conventional heating, whereby microwave heating tends to reduce the reaction temperature compared to conventional heating. The first oil-in-water emulsion [4A] is subjected to decantation [5] to separate the water insoluble PVC macro-particles [5B] (the primary structure of PVC) from the oil-in-water emulsion comprising the amine solvent [5A] (the second oil-in-water emulsion). The second oil-in-water emulsion [5A] is then fed to a de-emulsification (an extraction) column [6], wherein the column's temperature may be slightly higher than the temperature of the emulsification reactor [4] by injecting a stripping gas [6A] in the de-emulsification column [6]. The stripping gas [6A] is an inert gas comprising water vapor (steam), or nitrogen, and combinations thereof. At the top of the de-emulsification column [6], the amine solvent is recovered and recycled [3B]. At the bottom of the de-emulsification column [6], the broken (de-emulsified) oil-in-water emulsion [6B] resulting from the amine solvent extraction is fed into a heat exchanger [7] to exchange heat with a water stream [2]; thereby producing the pre-heated water stream [2A], and a de-heated and de-emulsified oil-in-water emulsion [7A]. The latter [7A] is subjected to phase separation by a hydrophobic membrane [8] to effectively separate the water phase [2B] from the oil phase [8B]; wherein the de-oiled water [2B] is recycled; and wherein the de-watered oil phase comprising the heavier aromatic hydrocarbons and 2-ethyl-1-hexanol of the plasticizer and/or the heavier aliphatic hydrocarbons of the heat stabilizer is recovered. Here, the recovered PVC macro-particles [5B] (the restored PVC primary structure) can be used as a primary recycled material (e.g., for blending with virgin PVC polymers and/or as a direct raw material to produce different PVC products). The recovered oil phase [8B], for example, can be blend with lighter hydrocarbons (e.g., lighter crude oil), subjected to refilling to produce fuels and/or other by-products, or used as precursors or raw materials for other applications.

The novelty of this emulsification and de-emulsification embodiment of the invention further resides with using an amine solvent, as contrasted to aqueous solutions of stronger inorganic bases [e.g., potassium hydroxide, sodium hydroxide (soda), soda lime (a mixture of sodium hydroxide, calcium oxide and calcium hydroxide), or calcium hydroxide] to form an oil-in-water emulsion from the hydrated and heated (softened) PVC waste materials as well as other oil-water phase separation methods; which assumes considerable benefits as a reversible weak base-weak acid reaction when it comes to simultaneously: (1) recovering and recycling the amine solvent for reuse; (2) directly de-emulsifying (breaking) the oil-in-water emulsion by extracting the amine solvent; and (3) effectively separating the de-emulsified oil-in-water into an oil phase and a water phase by a hydrophobic membrane. Neither of the first two benefits can be attained by using aqueous solutions of stronger inorganic bases; wherein the first important word is "recycling", for it is not possible using such inorganic bases; and wherein the more important word is "breaking", for it additionally requires the use of a stronger inorganic acid (e.g., hydrogen chloride) to separate the cation of the inorganic base from the weak acids-water phase, and wherein the water phase, after separating the weak acids from it, also requires neutralization by also another strong inorganic base. That is to say, in a word, the use of inorganic bases "defies" the important words "recycling" and "breaking".

By selectively extracting the heavier aromatic hydrocarbons (a plasticizer) and/or the heavier aliphatic hydrocarbon (a heat stabilizer), the primary structure of PVC is essentially restored, which is the essential purpose of primary recycling. This restored primary structure of PVC from waste materials can be further re-arranged in relation to de-chlorination and to itself by removing hydrogen chloride, thereby forming a secondary polymeric structure (e.g., polyene). The selected amine solvents are good nucleophiles, which react with PVC polymers at a proper temperature very effectively to release hydrogen chloride from the polymers, scavenge the released hydrogen chloride, and produce polyene ($[-CH=CH-]_n$). As protons are lost in the de-protonation step (polyene formation), hydrogen chloride reacts with the amine solvent (e.g., IPA). This dual overall reaction may be simplified as follows:

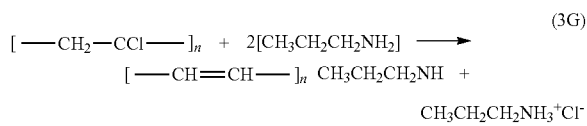

Here, only one mole of an amine solvent is needed to undergo the reaction with hydrogen chloride (the release of hydrogen chloride to form polyene). The second mole of the amine solvent is merely used to scavenge the released hydrogen chloride. Here, too, a less reactive (as well as a less expensive) amine solvent such as a tertiary amine solvent (e.g., TMA, TEA and TPA), or even a feebly acidic inorganic base such as calcium hydroxide, can be used instead of the second mole of the amine solvent to scavenge the released hydrogen chloride. A tertiary amine solvent is reactive toward hydrogen chloride, but cannot form elimination (polyene) and/or substitution side-reactions. There is also a far more important benefit of co-using such a tertiary amine solvent. In the final stage of the de-chlorination curve of a released hydrogen chloride, the release rates typically reach asymptotic values, which are largely independent on reaction's temperature or concentration of the amine solvent (or any agent), but may be due to possibly minor substitution side-reactions and/or very likely back diffusion of the released chlorine into the PVC material. The use of a tertiary amine as the second mole for merely scavenging the released hydrogen chloride may prohibit the back diffusion of the released chlorine by the first mole of the amine solvent (e.g., IPA). After completing the reaction; however, a stronger inorganic base can be used for the sole purpose of stripping off and recover the amine solvent or co-amine solvents, and convert the scavenged hydrogen chloride by the amine solvent or amine co-solvents into a water-soluble chloride-salt of the cation of the stronger inorganic base.

Recall that the hydrothermal de-chlorination using water alone typically proceeds in three stages: a very slow initial stage, a take off main stage, and a level off final stage. Here, the restored primary structure of PVC in an aqueous stream was tested using an amine solvent (e.g., IPA) at $M_r$ of 0.02, 0.2 and 2, a pressure of 60 bar and a temperature range of 225-275° C.; wherein the latter are above the critical pressure and critical temperature of IPA. The starting point and the end point of this temperature range were deliberately targeted for testing since this range corresponds to, respectively, the lower end temperature (225° C.) and starting temperature of the main stage (275° C.) of a typical temperature range (225-400° C.) of a PVC hydrothermal reaction using only water.

The performance of the amine solvent (IPA) was also tested against only water and aqueous solutions of sodium hydroxide at the same pressure, temperature range, and the same $M_r$ in the case of the aqueous sodium hydroxide [0.02, 0.2 and 2]. In each operating condition and at each stage of the hydrothermal curve, the amine solvent was far more effective in de-chlorinating the restored primary structure of PVC than using only water or the aqueous solutions of sodium hydroxide.

Figure 3E:
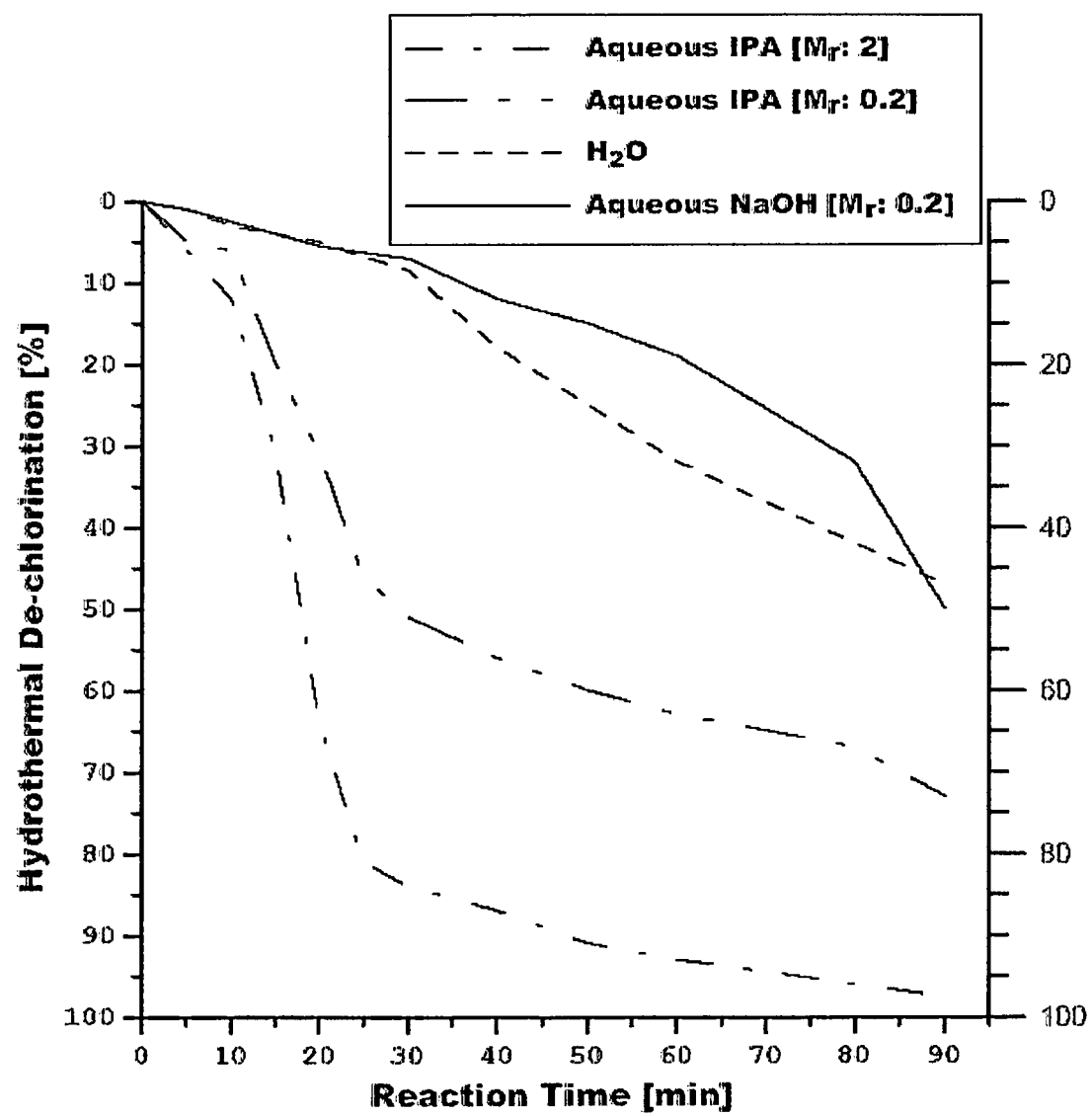
FIG. 3E illustrates the hydrothermal de-chlorination of PVC with only water, a strong inorganic base, and an amine solvent.

FIG. 3E, for example, illustrates the effectiveness of the amine solvent, which shows of the tested aqueous amine, only water, and aqueous sodium hydroxide at the lowest tested temperature (225° C.). In the initial stage; wherein the de-chlorination rates are actually independent on nucleophilicity or basicity; the reaction times of the amine solvent ($M_r$ of 0.2 and 2) were much faster (about 5-10 min) than the reaction times of both (within about 25-30 min) the water alone and the aqueous sodium hydroxide ($M_r$ of 0.2). Here, the less effective de-chlorination using water alone at all stages of the hydrothermal curve is expected at this low reaction temperature, and the far less effective de-chlorination using aqueous sodium hydroxide at almost all stages (even worse than using water alone in the main stage) is also theoretically pre-indicated (Paragraph [0068]). On the other hand, after 5-10 min (of the initial stage), the de-chlorination rates of the amine solvent amine takes off steeply. This is the main stage; wherein, at the reaction time of about 30 min, the de-chlorination rates of the amine solvent ($M_r$: 0.2) is about 5-times higher than the de-chlorination the rates using water alone or the aqueous sodium hydroxide ($M_r$: 0.2). Within the about same reaction time (30 min), the de-chlorination rates of the amine solvent ($M_r$: 2) is about 8-times higher than the de-chlorination rates using water alone. In both cases of the amine solvent ($M_r$: 0.2 and 2), the de-chlorination levels off after about 30 min; which is the final stage, wherein the de-chlorination rates are not essentially influenced by the reaction temperature and/or $M_r$, but possibly by side-reactions (e.g., minor substitution reactions) and/or back diffusion of chlorine from the released hydrogen chloride into the polymeric material.

The amine solvent, itself, is delivered to the de-chlorination reactor within its supercritical pressure and temperature to react with the restored primary PVC aqueous solution in the reactor at equal temperature and pressure. As such, the amine solvent as delivered at its supercritical conditions effuses through polymers like a gas and dissolves in the polymers like a liquid; which makes the polymers to appreciably swell, thereby creating many pores spaces with larger pore sizes (e.g., 15-28 μm depending on the $M_r$), and yet within the polymers; even though the mixture, itself (the amine-PVC aqueous solution) in the de-chlorination reactor is not at its critical conditions. Indeed, the much faster reaction times in both the initial and the main stages of de-chlorination using the amine solvent can be largely attributed to the swelling of the polymers. It follows that at such pressure and temperature conditions in the de-chlorination reactor, which are far below the critical temperature and pressure of water (Table 1), the use of water alone or the aqueous sodium hydroxide (e.g., sodium hydroxide in water is just a spectator when it comes to any sub- or super-critical fluid capability) may make a few pore spacing with smaller pore sizes (e.g., 1-3 μm in the case of the aqueous sodium hydroxide) on the surface of, not within, the polymers; thereby cannot hope to match the performance of the amine solvent.

In addition, the $r_e$ of the protonated amine solvents are larger (e.g., IPA is about 3-times larger) than the $r_e$ of the neutral cation (e.g., sodium) and the $r_e$ of the OH$^-$ anion of a strong inorganic base (sodium hydroxide). The $r_e$ of the protonated amine solvent are even larger than the $r_h$ of the OH$^-$ anion; thereby creating more pore spaces with larger pore sizes and within the polymers. This lends further supports to the effective de-chlorination mechanism of the amine solvents.

Recall that the reaction of the amine solvent [Eq. (3G)] requires one mole to release the hydrogen chloride and one mole to scavenge the released hydrogen chloride. Here, the use of a tertiary amine solvent (e.g., TMA, TEA and TPA) as the second mole for the purpose of scavenging hydrogen chloride could mitigate the back diffusion of chlorine from the released hydrogen chloride by the first mole of the amine solvent into the PVC material.

Figure 3F:
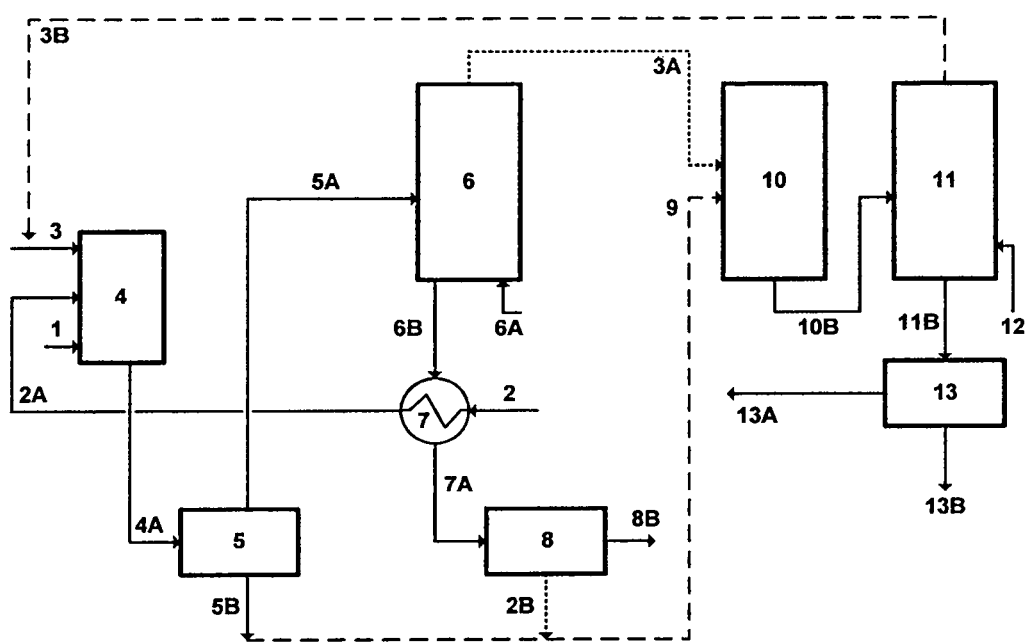
FIG. 3F illustrates a possible flow diagram for the emulsification and de-emulsification step and de-chlorination step of PVC waste materials.

It follows that in another embodiment of this invention, which is shown in FIG. 3F, the de-chlorination of the restored primary structure of PVC from the emulsification and de-emulsification stage using an amine solvent can be effectively attained. With the exception of steps 2B, 5B, and 3A, the rest of the steps [1, 2, 2A, 3, 4, 4A, 5, 5A, 6, 6A, 6B, 7, 7A, 8, and 8B] as shown in FIG. 3D are the same as also shown in FIG. 3F and described above. The recovered primary structure of PVC [5B] is hydrated with the separated water [2B], and the hydrated primary structure of PVC [9] is de-chlorinated by the recovered amine solvent [3A] from the de-emulsification column [6] in a de-chlorination reactor [10]. The $M_r$ of the amine solvent to the PVC content in the hydrated primary structure of PVC [9] can be within 0.02 to 2 (or higher if required) depending on the selected temperature of the de-chlorination reactor [10]. The range of temperature can be within the upper $T_m$ of PVC (e.g., 210° C.) to 300° C. (or higher). This temperature range is within or above the critical temperatures of the selected amine solvents. As such, the recovered amine solvent [3A] can also be delivered to the de-chlorination reactor [10] at a pressure within or above the critical pressure of a selected amine solvent(s). This, in combination with the effective temperature that falls with the critical temperature of the amine solvent, unleash the full reaction power of the selected amine solvent at its supercritical pure fluid conditions. Once the de-chlorination reaction completed, the exiting stream [10B] of the de-chlorination reactor [10] is fed to a salting-out column [11] (a vent stream of the top of the de-chlorination reaction may also be fed to the salting-out column, which is not shown in FIG. 3F); wherein an aqueous solution of a stronger inorganic base [12] is injected in the salting-out column [11] to separate the amine solvent from the scavenged hydrogen chloride and polyene, and to convert the scavenged hydrogen chloride into a water-soluble chloride-salt in the form of the neutral inorganic cation of the stronger base. At the top of the salting-out column [11], the amine solvent [3B] is recovered and recycled. At the bottom of the salting-out column [11], the broken products [11B] resulting from the amine solvent extraction is subjected to decantation [13] to separate the water-soluble chloride-salt [13A] from polyene [13B]. The higher thermal energy within the recovered amine solvent [3B] from the top of the salting-out column [11] can be exchanged in a heat exchanger (not shown in FIG. 3F) to further heat the recovered amine solvent [3A] from the top of the de-emulsification column [6] before the latter [3A] enters the de-chlorination reactor [10]. Similarly, the higher thermal energy within the water-soluble chloride-salt [13A] from the decantation unit [13] can be exchanged in another heat exchanger (also not shown in FIG. 3F) to further heat the hydrated primary structure of PVC [9] prior to entering the de-chlorination reactor [10].

The novelty of this de-chlorination embodiment of the invention resides with using an amine solvent, as contrasted to using only water or an aqueous solution of a strong inorganic base, to release the hydrogen chloride and scavenge the released hydrogen chloride thereby forming polyene from a PVC primary structure; which also assumes considerable advantages as a reversible weak base-strong acid reaction when it comes to: (1) effectively releasing hydrogen chloride, scavenge the released hydrogen chloride and forming polyene at the supercritical conditions of an amine solvent, which are below the typical conditions of de-chlorination using water alone or an aqueous solution of an inorganic strong base; and then (2) breaking the scavenged hydrogen chloride from the amine solvent, thereby simultaneously recovering and recycling the amine solvent, and converting hydrogen chloride into a water-soluble chloride-salt. Neither of these benefits can be attained by using water alone or an aqueous solution of an inorganic base. Here, the first important word is "condition", for it is within the supercritical properties of an amine solvent. The second important word is "effectiveness", for it is pronounced with an amine solvent. The third important word is "recycling", for it is attainable with an amine solvent.

The de-chlorination step can be used as a standalone setup to de-chlorinate unmodified, barely modified, or chlorinated PVC waste materials, and combinations thereof (e.g., rigid pipes, fittings, etc.). It can also be integrated with a refining setup, a waste-reduction setup (e.g., incineration), or a waste-to-energy setup (e.g., staged pyrolysis-combustion). Yet, this de-chlorination step can be reversed to chlorinate, rather than to de-chlorinate, PVC materials at a lower temperature range (e.g., 90-120° C.).

The stronger inorganic base [12] to separate an amine solvent from the scavenged hydrogen chloride and convert the scavenged hydrogen chloride into a water-soluble chloride-salt is selected from the group consisting of potassium hydroxide, sodium hydroxide (soda), soda lime (a mixture of sodium hydroxide, calcium oxide and calcium hydroxide), or calcium hydroxide, and combinations thereof. Calcium hydroxide is economically preferred as a feebly acidic inorganic base, if high aqueous solubility (the solubility limit of calcium hydroxide is about 24 mol/L) is not critical, followed by soda lime to essentially mitigate the limited aqueous solubility of calcium hydroxide. The use of an aqueous solution of calcium hydroxide or soda lime [12] to convert the scavenged hydrogen chloride would result in an aqueous solution of calcium chloride or sodium-calcium hydroxide [13A]; which, in turn, can be used to generate calcium hypochlorite or sodium-calcium hypochlorite as a chlorination source.

Figure 3G:
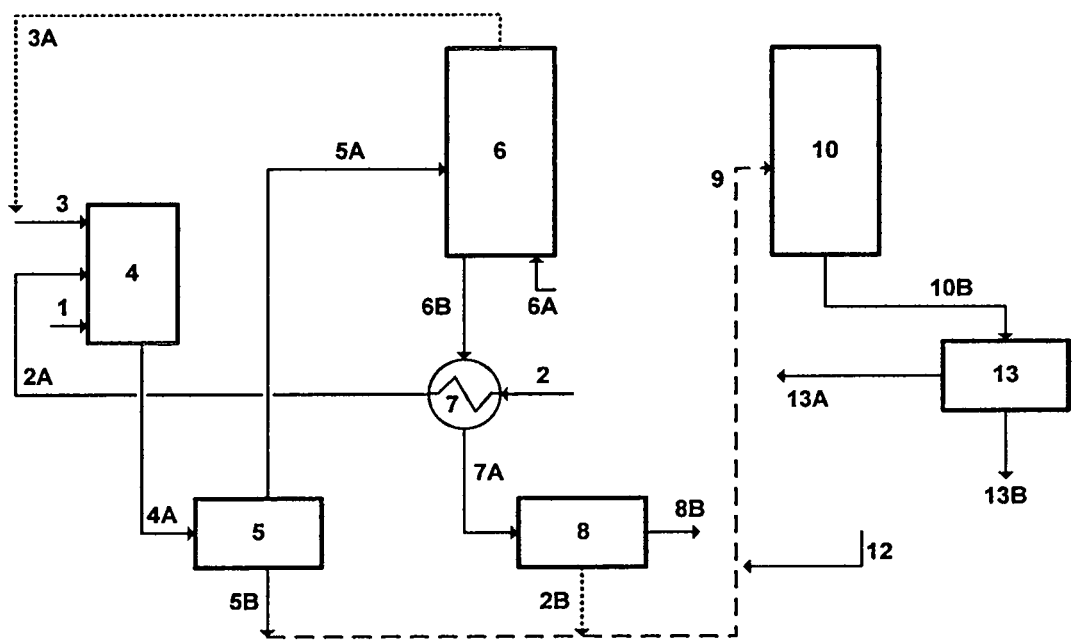
FIG. 3G illustrates another possible flow diagram for the emulsification and de-emulsification step and de-chlorination step of PVC waste materials.

In a further embodiment of this invention, which is shown in FIG. 3G, the de-chlorination of the restored primary structure of PVC can alternatively be simplified using calcium hydroxide but at a temperature within 275-300° C. One reason is that calcium hydroxide is a less expensive feebly acidic base; not an expensive non-acidic base such as sodium hydroxide or potassium hydroxide. Another reason is that the $r_e$ (0.101 nm) of the calcium cation is essentially comparable to the $r_i$ (0.098 nm) of the sodium cation, but the higher charge of calcium cation makes it more hydrated than the sodium (or potassium) cation. This is reflected in its higher $r_h$, EIE and $\Delta G_S$ (FIGS. 2B through 2D) as well as the lower $pK_a$ (FIG. 2E) than that of the sodium (or potassium) cation. A further reason is that two moles of the OH$^-$ anion and one mole of the more hydrated divalent neutral calcium cation (Ca$^{+2}$) are produced for every mole of calcium hydroxide that dissociates in water; thereby requiring a less amount of the feebly acidic calcium hydroxide [Ca(OH)$_2$] compared to the non-acidic sodium or potassium hydroxide [NaOH or KOH]. Here, the two moles of OH$^-$ of the feebly acidic Ca(OH)$_2$ that completely dissociates in water can undergo the reaction to release hydrogen chloride, whereas the one mole of the more hydrated neutral Ca$^{+2}$ scavenges two moles of chloride from the released hydrogen chloride. As such, except for steps 2B and 5B, the rest of the steps [1, 2, 2A, 3, 3A, 4, 4A, 5, 5A, 6, 6A, 6B, 7, 7A, 8, and 8B] as shown in FIG. 3D are the same as also shown in FIG. 3G. The recovered primary structure of PVC [5B] is hydrated with the separated water phase [2B], and the hydrated primary structure of PVC [9] is mixed with an inorganic base [12] and fed to a de-chlorination reactor [10]. The preferred inorganic base [12] is calcium hydroxide, followed by soda lime. Of course, non-acidic inorganic bases (e.g., sodium hydroxide, potassium hydroxide, and the like) can be used, but in addition to their ineffective performance (e.g. sodium hydroxide) at a reasonable desirable temperature range, they are more expensive and require higher molar consternations than calcium hydroxide. Once the de-chlorination reaction is completed, the exiting stream [10B] of the de-chlorination reactor [10] is subjected to decantation [13] to separate the water-soluble chloride-salt [13A] from polyene [13B]. The thermal energy within the water-soluble chloride-salt [13A] can be exchanged in a heat exchanger (not shown in FIG. 3G), to further heat the hydrated primary structure of PVC including the inorganic base [9] prior to entering the de-chlorination reactor [10].

Modifying PVC Products

Chlorinating PVC

Nearly 50% of the world's annual production of PVC polymers is used for producing pipes. The upper temperature threshold for using rigid PVC products with the typical chlorine content of 56-57 wt % is about 60° C. Some piping, construction materials (e.g., moldings, sheets, etc.) and other products; however, require a higher temperature threshold and a higher dimensional stability for hotter and more corrosive environments.

Chlorination, by increasing the chlorine content in PVC to 66-67 w %, is the way to raise the upper temperature threshold to about 100° C. and improve dimensional stability. This additional reaction with chlorine is aimed at the "—CH$_2$—" group along the PVC homo-polymer chains to virtually co-polymerize these chains (vinyl chloride as well as 1, 2 dichloroethylene). This is because co-polymers have better thermal and dimensional stability as well as better resistant to chemicals, but the co-polymers are even less porous than the homo-polymers.

In general, CPVC may be produced by reacting chlorine gas with PVC powders or an aqueous solution comprising suspended PVC particles followed by exposure (on/off) to UV light. However, chlorine gas is more reactive since it has one unpaired electron at its outer valence shell, but less effective/selective in radical (e.g., light, peroxy compounds, etc.) chlorination. This, in combination with the formed less porous co-polymers, lead to inconsistent or heterogeneous chlorination of PVC.

Here is how one modification for chlorinating PVC [U.S. Pat. No. 3,663,392] is described, which also essentially repeats the underpinning problem of chlorinating PVC:

"In the pre-reaction, owing to the action of light, chlorination takes place very rapidly so that only the outermost layer of the polyvinyl chloride granules is chlorinated. Since the rate of chlorination is much higher than the rate of diffusion of chlorine, the interior of the polyvinyl chloride granules is not attacked.

In the main reaction the temperature is above the softening point of polyvinyl chloride but below the softening point of chlorinated polyvinyl chloride. The thin layer of chlorinated polyvinyl chloride prevents the polyvinyl chloride granules from agglomerating but on the other hand permits the gaseous chlorine to diffuse into the interior of the granules. Since the chlorination in the main reaction is carried out while excluding light, the rate of chlorination is much lower. In consequence of the higher temperature however the rate of diffusion of chlorine has become so high that a homogeneous chlorination of the whole of each granule can take place."

Sometimes, a problem is obvious, everyone sees it, but nothing happens until someone decides to do something innovative about it. Here, the obvious problem lies within the formation of less porous virtually co-polymer chains along with the so reactive yet non-selective chlorine gas. The virtual formation of such co-polymer chains not only reduces the porosity, but also reduces mobility via their possible cross-linking; thereby decreasing pore spacing and increasing $T_g$. These factors, in tandem, support less effective chlorination.

Chlorine gas reacts rapidly with water to form hypochlorous acid and hydrogen chloride as follows:

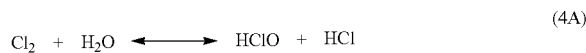
(4A)

Hypochlorous acid is a weak acid with a $pK_a$ value of 7.54, which further forms the free radical hydroxyl and chlorine:

(4B)

When an amine solvent (e.g., WA) is introduced to such a chlorinated aqueous solution, it reacts with both the hypochlorous acid and hydrogen chloride as follows:

(4C)

(4D)

These two reactions are essentially similar to the overall reaction as given in Eq. (3G).

In the main chlorination reactor, where the problem of conventional chlorination lies, the reaction temperature is within the lower $T_m$ range (e.g., 90-120° C.). Here, an amine solvent reacts efficiently: (1) with the dissociated hypochlorous acid [Eq. (4B)] to convert practically all of the free radical chlorine very rapidly (within a second) to the amine form [Eq. (4C)]; (2) with the released hydrogen chloride from the hydrolysis of chorine [Eq. (4A)] to scavenge practically all of the released hydrogen chloride in the amine form [Eq. (4D)]; and (3) to make the PVC polymer chains swell, thereby creating many pore spaces with larger pore sizes within the inner of the polymer chains. As such, the chlorination of PVC polymer chains using an amine solvent can be attained efficiently. The decay rate of the chlorine-amine form ($CH_3CH_2CH_2NHCl$) is significantly slower that the decay rate of free chlorine (regardless of using light or not), which is essential in the main chlorination reactor of PVC polymer chains especially at relatively higher temperatures. On the other hand, the dissociated OH* radicals [Eq. (4B)] are very reactive (e.g., the strongest free radicals) and very small in size, thereby easily diffusing through the swollen PVC polymer chains by an amine solvent. The OH* radical distribution depends on the pH; wherein the OH* free radicals are dominant at pH values below 6, less dominant at about neutral pH values (e.g., 7.6-8), and vanished altogether at pH values above 9. It follows that by introducing the amine solvent and a chlorine source into the PVC aqueous solution under a more selective condition (e.g., within or slightly below the $pK_a$ of the hypochlorous acid), the OH* free radicals would further enhance chlorination.

This simple embodiment of the invention is applicable for chlorinating PVC polymers regardless of their polymerization methods, using or not using UV light, or the chlorine source. The chlorine source can be chlorine gas or hypochlorite (e.g., sodium hypochlorite, or calcium hypochlorite, and combinations thereof). The method is also applicable to chlorinate a blend of actual co-polymers; wherein vinyl chloride is the main polymer; and wherein the co-polymer is selected from the group consisting of ethylene, propylene, vinyl acetate, vinyl alcohols, vinyl ethers, vinylidene chloride, acryonitrile, or acrylic esters, and combinations thereof.

Heat Stabilizing PVC

The principle of "microscopic reversibility" tells us there is a symmetry of cause and effect in nature. PVC is a pronounced example. The thermal stability of PVC polymers during processing is known to be much lower than should be on the basis of their primary structure. PVC polymers, regardless of their processing approach or the purpose of it, exhibit collective changes in structure, reflected by the release of hydrogen chloride (effect), but dictated primarily by temperature (cause).

A short cut is reducing a reaction time to reduce the release of hydrogen chloride especially at a temperature above 225° C. Reconciling the difference between an effective temperature and a shorter reaction time is attempted by heat stabilizers. If one believes that a heat stabilizer is applicable for each reaction temperature while irreversible binding of released hydrogen chloride can take a place, then the next embodiment of this invention provides a format for a much better heat stabilizer.

The $Al^{+3}$ first $pK_a$ is about 5 (FIG. 2E), where it generates its first hydrolysis product as follows:

(5A)

This means that, at normal pH, the first hydrolysis product of $Al^{+3}$ has already existed. A second and a third hydrolysis could take place to liberate a second and a third $H^+$ proton, which tend to increase the solution acidity. Each free $Al^{+3}$ $(H_2O)_6$ species acts as a buffer; thereby requiring three $OH^-$ anions to neutralize its acid effect until most $Al^{+3}$ is precipitated through. The overall reaction may be expressed as follows:

(5B)

This overall reaction is shown by the controlled titration curve of gibbsite in FIG. 3H. However, there is no smooth transition from first to second to third hydrolysis products in a real situation such as geo-formation. The $Al(OH)^{+2}(H_2O)_5$ species appear appreciably as the pH approaches 4 to 5; thereby dimerizing to $(H_2O)_5Al(OH)_2Al(OH)^{+2}(H_2O)_5^{+4}$, and the dimers polymerize further until precipitates appear; wherein $Al^{+3}$ is relatively insoluble above a pH of 4. As such, the non-precipitated $Al^{+3}$ species present as either a solution-phase or adsorbed monomeric and polymeric species [$Al(OH)^{+2}(H_2O)_5$; $Al(OH)^{+2}(H_2O)_5$; $Al(OH)^{+2}(H_2O)_4$; $(H_2O)_5Al(OH)_2Al(OH)^{+2}(H_2O)_5^{+4}$; etc.].

Dimerization is the most basic step for monomeric cations to grow into solid phases, which is a precursor for both adsorption and precipitation. Cations, from either tetrahedral or octahedral coordination, interact and complex with water and/or anions. The $r_e$ of cations are direct manifestations of their relative numbers of electrons and protons; thereby affecting their coordination by oxygen (oxide or hydroxide) anions, both in aqueous and solid phases. On the other hand, the idealized radius ($r_i$) of cations are direct indications of their relative fitness into a tetrahedral or octahedral configuration created by the closest packing of the anions.

Since the $r_e$ of oxygen is 0.14 nm in octahedral coordination and 0.138 nm in tetrahedral coordination, the ratio of the idealized radius of an inorganic cation to the effective radius of oxygen ($r_i/r_e$) for tetrahedral coordination is 0.225; thereby the ideal cation has a radius of 0.031 nm. $Si^{+4}$ (0.026 nm) is close to ideal. The range of $r_e$ for inorganic cations found in oxide or hydroxide tetrahedral may be 0.026 ($Si^{+4}$) to 0.049 nm ($Fe^{+3}$-tetra). Here, since the charge of $Si^{+4}$ is +4, it attracts the oxygen so strongly; thereby does not exist as a separate cation, but in the form of oxy-acids (e.g., $H_4SiO°_4$) or oxy-anions; thereby its hydration or solvation free energy becomes meaningless because water cannot coordinate the $Si^{+4}$ without itself breaking down. Here, too, trivalent cations can take place in a tetrahedral and an octahedral coordination since the $r_e$ of $Al^{+3}$ is from 0.039 nm (tetra) to 0.053 nm (octa), and the $r_e$ of $Fe^{+3}$ is from 0.049 nm (tetra) to 0.065 nm (octa). On the other hand, the $r_i/r_e$ for octahedral coordination is 0.414; thereby the ideal cation has a radius of 0.058 nm; thereby $Al^{+3}$(0.053 nm) and $Fe^{+3}$ (0.065 nm) are close to ideal. The range of $r_e$ for inorganic cations found in oxide or hydroxide octahedral may be from 0.053 nm ($Al^{+3}$) to 0.17 nm ($Cs^+$ may be largest inorganic cation).

How does a structural configuration link-up into dimmers? Oxide and hydroxide tetrahedral tend to link corners whereas octahedral tend to link edges. The higher charge cations (e.g., with a charge of +4 and up) tend to occur in tetrahedral; wherein Coulombic repulsion energy repels them from each other; but it is countered by the Coulombic attractive energy that to be gained by oxygen anions, where the latter can coordinate two cations. In octahedral, the inorganic cations tend to be divalent or trivalent; with $r_e$ that are larger than the $r_e$ of the cations in tetrahedral; with not so excessive Coulombic repulsion energies; and with very pH-dependent dimerization that takes place as soon as the first hydrolysis product begins to form at a pH somewhat below the first $pK_a$.

The surfaces of solid (mineral) complexes are generally charged; most likely, in a real situation (e.g., geo-formation), with negative charges resulting from isomorphous substitution or vacancies such as the most commonly octahedral $Al^{+3}$ or $Fe^{+3}$ is replaced by octahedral $Mg^{+2}$ resulting in a "−1" surface charge; or tetrahedral $Si^{+4}$ is replaced by tetrahedral $Al^{+3}$ or $Fe^{+3}$ resulting in a "−1" surface charge. The opposite could also take place such as octahedral $Mg^{+2}$ is replaced by octahedral $Al^{+3}$ or $Fe^{+3}$ resulting in a "+1" surface charge. Thus, such mineral complexes are generally attractive toward inorganic actions within their aqueous environment; wherein water is also competitively attracted to these inorganic cations; thereby there is continual opposing forces determining which of the cations will be absorbed and/or precipitated to be bound in the solid phase, and which will be soluble in the aqueous phase. If given sufficient time to equilibrate, some fraction of each inorganic cation in each phase would be established Adsorption is a net accumulation of species occurs at the interface between two phases. If conditions are taken to extreme, adsorption can advance into co-precipitation or precipitation. The latter, of course, can take place in the absence of any absorption, once the solubility limit of an inorganic compound or complex in an aqueous phase is exceeded.

$Al^{+3}$ and $Fe^{+3}$ oxyhydroxides precipitate as solids of high surface area; thereby creating abundant adsorption sites for other cations. The pH at which 50% of a cation is absorbed into $Al^{+3}$ and $Fe^{+3}$ oxyhydroxides is $pH_{50}$. The correlation between the $pH_{50}$ values of some divalent cations and their first $pK_a$ values is shown in FIG. 4B. The values of $pH_{50}$ for divalent cations are generally 2 to 3 pH units below their first $pK_a$ correspondent values. The latter (the first $pK_a$) is a measure of the affinity of the cation for $OH^-$ anions over water. The former ($pH_{50}$) is a measure of the affinity of the cation for the surface of $OH^-$ anions over an aqueous solution. That is to say then that adsorption resembles dimerization, in that there are always $OH^-$ groups on an absorptive surface of $Al^{+3}$ or $Fe^{+3}$ oxyhydroxides; wherein a hydrated cation becomes much more reactive with the absorptive surface of $Al^{+3}$ or $Fe^{+3}$ once the hydrated cation forms its first hydrolysis product; thereby forming an edge-sharing adsorptive surface just as the aqueous octahedral dimer complex.

Figure 4A:
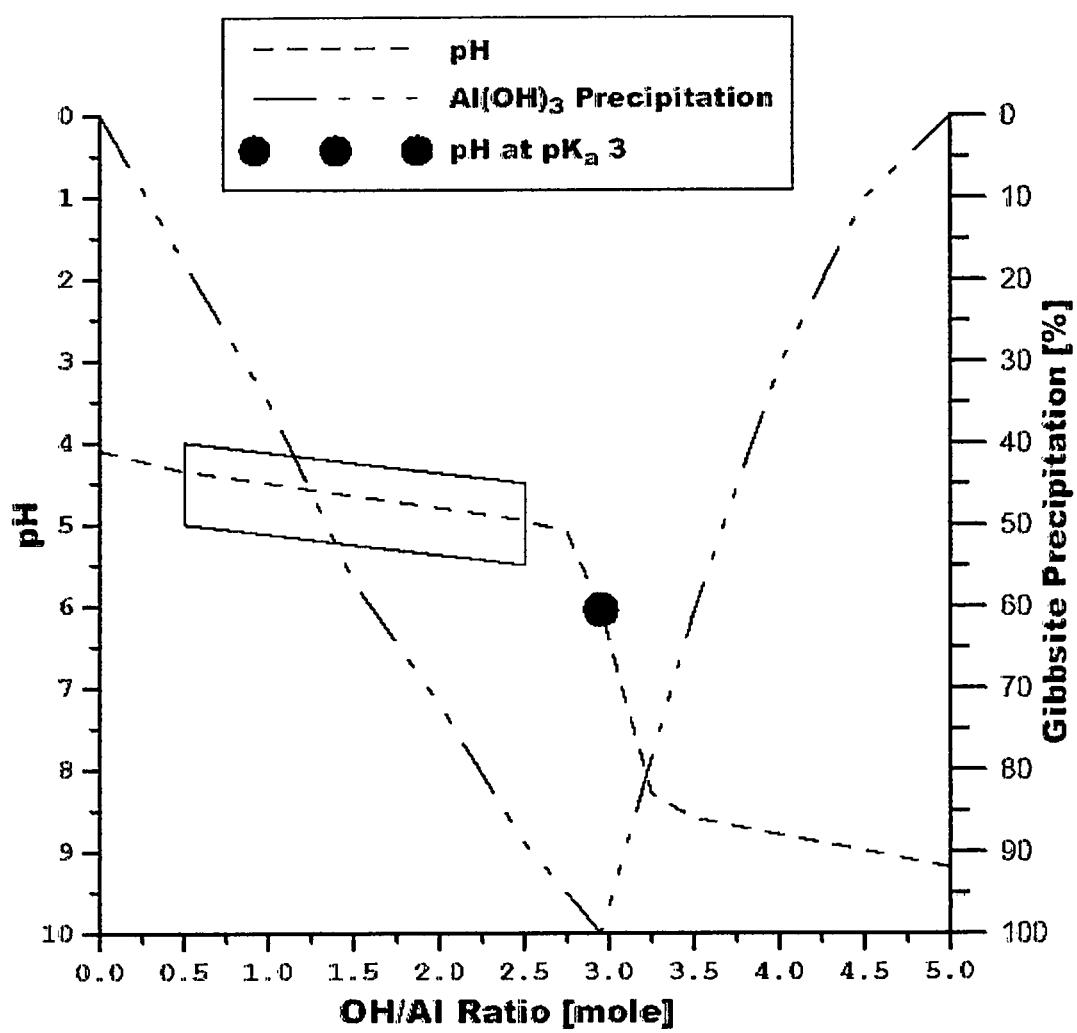
FIG. 4A illustrates the precipitation of Gibbsite.
Figure 4B:
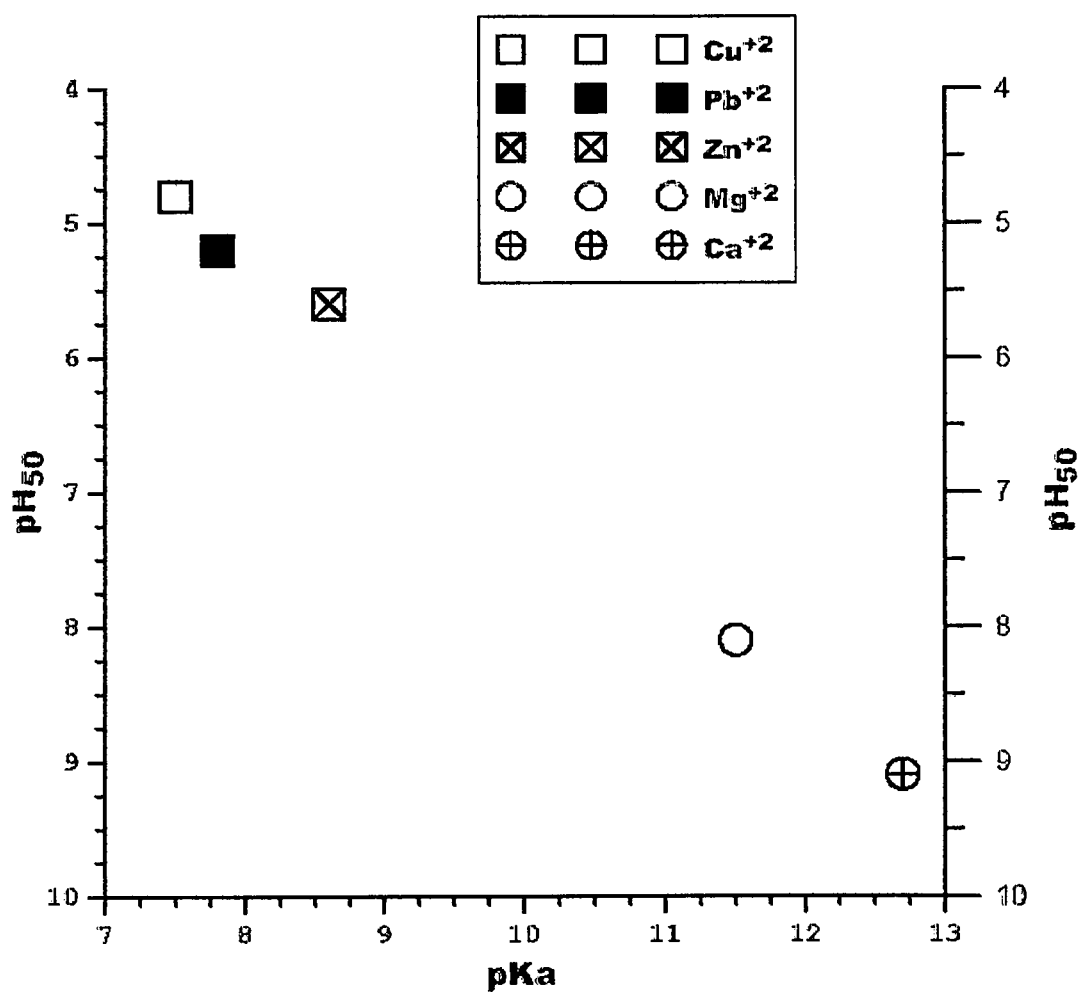
FIG. 4B illustrates $pH_{50}$ of divalent cations versus their first $pK_a$.

As shown in FIG. 4A, the approximate condition wherein the pH value is within the $pK_a$ value of 3 (shown as a black circle in the figure) will cause divalent cations absorption on hydroxylated $Al^{+3}$ surfaces. Any further increase in pH or in cations concentrations will also cause cations to precipitate as various oxyhydroxide minerals. The absorption of divalent cations to an $Fe^{+3}$ oxyhydroxide follows essentially the same pattern of the $Al^{+3}$ oxyhydroxide. The first $pK_a$ of $Fe^{+3}$ is 2.5, which is half of the $Al^{+3}$ first $pK_a$; thereby its oxyhydroxide, ferrihydrite [−3FeOOH.2Fe(OH)$_3$], has an adsorptive surface area of about 600 m$^2$/g.

Recall that: (1) the X—OH distances of most divalent and trivalent cations fall within the typical hydrogen bond signature distance (0.15-0.21 nm), thereby $OH^-$ anions are strongly bonded to such cations but $H^+$ protons are free to leave; (2) the amine solvents pick up $H^+$ protons to form protanated amines as conjugated weak acids, where their estimated $r_e$ are larger than any inorganic cation; and (3) the $Al^{+3}$ (or $Fe^{+3}$) hydrolysis product species at approximately pH values of 4 to 5 go through successive transitions from monomers to dimers to polymers with a high absorptive surface area. This embodiment of the invention, therefore, marries the useful individual attributes of such divalent and trivalent cations with an amine solvent (and if desired along with the long-chain aliphatic carboxylic acids) in polygamy to collectively create an effective mineral as a heat stabilizing additive; wherein the essential purpose of the latter is to absorb the initial release of hydrogen chloride so the reaction temperature and/or reaction time can be extended.

It follows that a heat stabilizer on the basis of the above described attributes can be made in varying ways. One way is a forward mode; that is moving from the left side to right side of FIG. 4A. This forward mode approach entails preparing a first aqueous solution of $Al^{+3}$ (or $Fe^{+3}$) from an aluminum source (e.g., aluminum nitrate) and an amine solvent (e.g., IPA); wherein the molar ratio of the amine solvent to $Al^{+3}$ can be in the range of 0.5 and 2.5 (shown as a rectangle in FIG. 4A); thereby creating a moderately acidic solution within the first $pK_a$ of $Al^{+3}$; whereby $Al^{+3}$ surface becomes highly absorptive. Magnesium from a magnesium source (e.g., magnesium nitrate) is added to the first aqueous solution to form a second aqueous solution; wherein the molar ratio of $Mg^{+2}$ to $Al^{+3}$ can be in the range of 2 to 5, but preferably 3; thereby adsorbing $Mg^{+2}$ on the hydroxylated $Al^{+3}$ surface before inducing precipitation. The second solution is then titrated with an amine solvent or a strong base such as sodium hydroxide or potassium hydroxide to increase the pH; thereby precipitating the mineral (Mg—Al-Amine) of various oxyhydroxides. The precipitate is then filtered, washed and dried. Here, the intercalated amine solvent between the layers of the mineral should enhance the absorption capacity for hydrogen chloride and extend the reaction time at higher temperature. The same procedure can be extended to $Fe^{+3}$; wherein the acidic solution is generated within the first $pK_a$, of $Fe^{+3}$.

An alternative way is a backward mode; that is moving from the far right side to the left side of FIG. 4A. This backward mode approach entails preparing a first aqueous solution by dissolving $Al^{+3}$ in an amine solvent (e.g., IPA); wherein the molar ratio of the amine solvent to $Al^{+3}$ may be 10; whereby this molar ratio is dictated by the molar ratio of the divalent cation to $Al^{+3}$ in the next step; thereby creating a basic solution. Magnesium from a magnesium source (e.g., magnesium nitrate) is added to the first aqueous solution to form a second aqueous solution; wherein the molar ratio of $Mg^{+2}$ to $Al^{+3}$ can be 3 (it can be varied within 2 to 5 but requires re-adjusting the molar ratio of the amine solvent to $Al^{+3}$ in the first step); whereby reducing the pH by consuming the hydroxide anions of the amine solvent (each mole of $Mg^{+2}$ consumes 2 mole of the hydroxide anion, and 1 mole of $Al^{+3}$ consumes 3 moles the hydroxide anion); thereby precipitating the mineral (Mg—Al-Amine) of various oxyhydroxides. In other words, the first aqueous solution is titrated by the second aqueous solution of magnesium to consume the hydroxide anions of the first aqueous solution; thereby reducing the pH. The precipitate is then filtered, washed and dried.

Other divalent cations such as calcium, copper and zinc can be intercalated along with magnesium. Long-chain aliphatic carboxylic acids such as stearic, palmitic, oleic, lauric, or myristic, and combinations thereof can also be intercalated with the mineral.

Recovering Heavy Oil from Geo-Formation

In the previous part of the invention, the description of PVC (a by-product of hydrocarbons) from its primary content to its hydrothermal treatment has been deliberately drafted in an unusual manner so that its involved chemistry (from hydration to source of acidity, from monomers to polymers, and from adsorption to precipitation) will closely resemble the content and the hydrothermal treatment of oil-bearing geo-formation, while it is still proper and correct. Heat stabilizers (among other additives) in the hydrothermal treatment of PVC are exchanged for clay stabilizers (among other additives) in the hydrothermal treatment of heavy oil-bearing geo-formation. The main difference is that the PVC is processed in a batch or semi-batch controlled reactor; whereas downhole geo-formation is the reactor.

The concept of "if it ain't broke, don't fix it" shows us the difficulty of trying to replace an existing or a more conventional method with a new, a different, or an improved method. The auto-reason of "doubting Thomases" always is "an unproven method". But; what if the proven method was proven to be destructive (physically, economically and environmentally)?

Here is how the physical destruction of heavy oil bearing geo-formation by steam is described [SPE 10077, 1981]:

"One of the problems identified in our studies of field pilots using steam injection is this practice of injecting the very alkaline and low ionic strength boiler effluent into the reservoir. Such an effluent has considerable potential for fluid-rock interactions, clay swelling and dispersion. These interactions can cause significant formation and well bore damage, with subsequent impairment of oil production.

Furthermore, clay minerals are generally more compatible with low rather than high pH fluids. Not only are expandable clay minerals of concern, but problems of increased cleavage or slaking reactions of non-swelling clays occur as the water becomes more alkaline.

It is common practice in steam stimulation to inject 8,000 $m^3$ or more, of 80% quality steam in each of several cycles per well. In the case of steam flood, or steam drive processes, the volume of injected steam can be many tens of thousands of cubic meters. The solubility of quartz sand and other silicate minerals rises rapidly with increasing temperature and pH, and therefore the present practice of steam injection can cause substantial dissolution and mobilization of the reservoir minerals.

An additional consideration with high temperature (300° C.) and high pH injection fluids is that sand consolidation agents such as silica cements or organic polymers and also clay stabilizers are likely to be less effective due to a rapid breakdown of the bonding and stabilizing agents.

A third reservoir damage effect that can be produced by the injection of the total boiler effluent is due to the incompatibility of the formation water and the injected water. Mixing of the waters causes reactions between the dissolved salts which produce precipitates. These insoluble compounds can reduce permeability, plug production wells, cause scale formation in production facilities and produce more stable water/oil emulsions."

Here are how the uncontrollable "blowout" of geo-formation by steam, the extreme expenses of steam, and the environmental consequences of steam described [SPE 189455, 2017]:

"Even in the deeper part of the reservoir, caprock integrity could be compromised from steam injection. The caprock shale . . . is only approximately 6-9 m thick . . . . In comparison, the extensive Clearwater shale overlying the Athabasca oil sands near and around the mining area is approximately 20 to 30 m on average . . . , and yet there have still been some incidents resulting from steam injection . . . . These unfortunate mishaps have led to investigative regulatory reviews . . . , imposed moratoria . . . , and, in some cases, interrupted or abandoned plans . . . .

The capital expenditure estimates . . . are reported to be upward of USD 7 billion; continually injecting steam would risk caprock integrity and possibly cause a fracture to surface, conceivably followed by a steam release incident or an area-surface expression (i.e., an euphemistically termed blowout or form of localized ground upheaval).

There are obvious downsides to any such occurrence: undeniable loss of control, obvious demonstration of failure, inevitable environmental effect, and general loss of creditability and public confidence."

A proposed alternative to avoid uncontrolled blowout of the geo-formation by steam is surface mining; which means complete demolition of the formation. Yet, surface mining was proposed right after starting the construction of the steam project. Surface mining is further justified as follows [SPE 189455, 2017]:

"It is sometimes stated that the limit for surface mining of oil sands in Athabasca is typically 75 m of cover.

The perceived depth limit to oil sands mining in Canada is an economic not a technical constraint to mining.

However, a simple guide to surface mining is the intuitive practice in the referenced areas (Canada). Mined bitumen deposits in Canada are usually less than 50 meters below the surface and may be extended to a depth of 75 meters, but anything deeper cannot be economically viable since too much overburden must be removed before accessing bitumen in sand deposits. Thus, the ratio of overburden to bitumen in sand deposits must be relatively low. The Alberta Energy Regulator (AER) defines this ratio as the total mining volume (TV) divided by the volume of bitumen in sand deposits or bitumen-in-place (BIP). The AER requires any section of a bitumen sand deposit with a TV/BIP ratio of less than 12 to be mined. But where the TV/BIP is higher than 12, mining may be economical if the bitumen content in sand deposits is high enough. The AER also defines the cut-off bitumen content in overburden (waste material) as 7%; the thereby bitumen content in sand deposits (sought out material) usually range from 8% to as high as 14%.

Yet, the average depth of the targeted viscous oil by the proposed surface mining [SPE 189455, 2017] including its deposit thickness is 173 meters in the shallower part of the reservoir; the estimated TV/OIP ratio (OIP: oil-in-place) ranges from 72 to 91; the estimated viscous oil content in sand deposits range from 1 to 3%; and this viscous oil is pourable liquid with some associated gas, not bitumen. All of these factors clearly violate mining economics; especially the low 1-3% content of this viscous oil in sand deposits, which are essentially considered useless waste materials not worthy of recovery (AER's bitumen content in overburden: ≤7%).

Figure 5A:
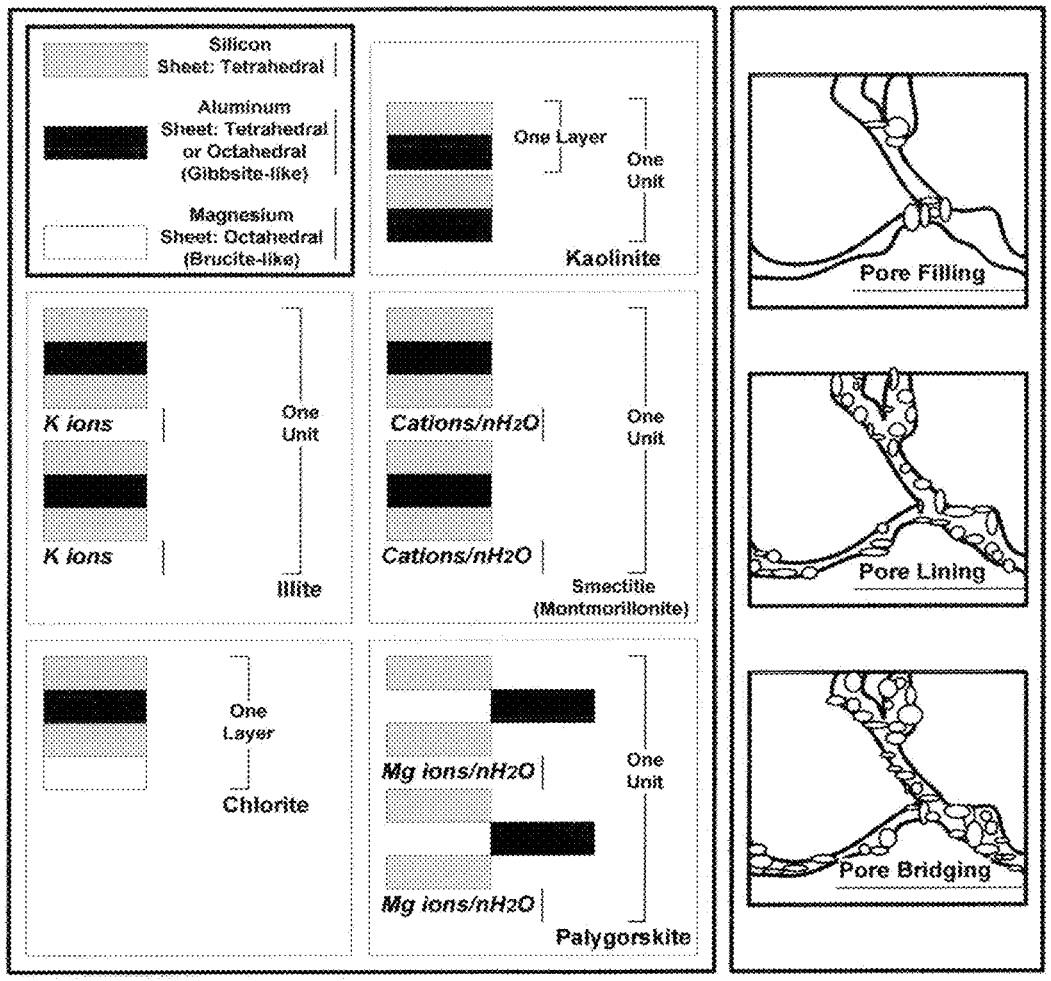
FIG. 5A illustrates the basic structure of clays in geo-formation and their dispersion effects.

Minerals in near earth's surface are by far predominated by oxygen followed by silicon; abundantly subordinated to a first approximation by aluminum, and to a second approximation by iron, calcium, potassium, sodium, and magnesium; with a large number of other elements with relatively minor concentrations; thereby the dominant anion is oxygen (oxide, hydroxide and oxyhydroxide forms) and the dominant cations are $Si^{+4}$ and $Al^{+3}$. The rise in the hydrothermal temperature between 160° C. and 240° C. generally breaks down the strongly attracted oxygen in minerals comprising $Si^{+4}$; thereby increasing the solubility of dispersed silicon by approximately 6-times. The use of a strong inorganic base, in itself, such as sodium hydroxide at a pH value of about 10 disperses (dissolves) aluminosilicate minerals (FIG. 4A); wherein such minerals are predominant foundation of clay's structures as shown in FIG. 5A; thereby causing pores filling, lining, or bridging, and combinations thereof as also shown in FIG. 5A. It is these facts which have placed the emphasis on moving away from using steam to extract heavy oil especially in shallower oil-bearing geo-formation.

However, I believe that one of the most innovative ideas; which was applied by the ancestors of this inventor since antiquity and may be still practiced to this day in different forms; is the "double hard-wired" instinct in sheep herding. Sheep have a strong "single hard-wired" instinct to follow the sheep in front of them. When a sheep decides to go somewhere, the rest usually follow, even if this lead sheep jumps over a cliff. Standing behind the sheep shoulders is the only point of balance for a sheep herder to move the herd forward; otherwise the sheep will refuse to move forward if they see the herder up ahead, which is a daunting task for a lone herder. The counter instinct is to inaugurate a sheep duffer, by separating a male sheep from his mother at birth, joining him with a donkey, whereby getting his milk from the donkey, thereby believing the donkey is his mother. Heretofore, the essential perception, where matters perceived as real are real in their consequences, is achieved. This hybrid sheep, donkey "milkgenic", is known as "Meryaa", which may be the first man-made transgenic animal, by changing the composition of the milk as the main strategy. The "Meryaa" is then honored by not shearing his wool, not trimming his horns, and decorating his chest with colorful bells; but restricting the flow to his testicles. The latter alternation takes out all the fight that was within him. He has to be as vain as the peacock while being as semblance as the loyal herding dog. His pseudo leadership thus becomes prominent in the herd, looking around in all directions watching if there is any danger, and marching in front of the herd when driven to or from pasture only as the donkey is driven by the sheep herder in the front. The "Meryaa" is neither a donkey nor a herding dog, but a docile sheep duffer. Hereupon, the essential purpose of a lone sheep herder effectively shaped this "double hard-wired" strategy; instead of the useless "wait on me" strategy; which made the near impossible purpose definitely possible.

Is the unreal also real? Through this metaphor, it becomes obvious that this simple effective ancient idea has been cross-pollinated in almost any played out situation that acquiescently defied sense. Evidence of the role of a generic form of the "Meryaa", as a vacuity duffer, is not hard to figure out. Herewith, the distinctive feature is that this generic form is dispensable once the contrived trick is discovered or decided to be discovered indicating most likely a change of direction or a "turncoat" replacement; or rarely oddly maintaining the status quo (the "sailing ship effect") for a little longer. But the rather striking parallelism in the essential perception and purpose of the two, the "Meryaa" and its generic form, is to be noted.

Oil has the strong instinct neither to mix with water nor even the will to follow the oil in front of it. It then occurred to me, why cannot I create my own "generic Meryaa" to herd heavy oil. What if the naturally occurring hydrocarbon acids content in oil-bearing formation is tricked to believe that water is its mother; and the acids content is not castrated, but gently properly enhanced to freely roam around to exercise its willpower over the rest of the oil to follow the leader; wherein the leader, in turn, follows its mother. This constructive metaphoric spin of the ancient sheep herder's idea could usefully immensely simplify viscous oil herding. Neither taking out the willpower of the leader, nor destroying the environment around leader, nor misleading the public is essential. This also neither implies using donkey's milk nor resides with pumping donkey's milk into viscous oil wells; even though donkey's milk may help smoothing the wrinkles within clayey pore spaces.

In this embodiment of the invention, heavy oil is extracted by directly emulsifying the heavy oil naturally present rich acids content (e.g., naphthenic acids) by aqueous amine and gentle heating, rather than extreme heating (e.g., high temperature steam). The rich acids content becomes an effective enabler to extract the heavy in water when it is gently converted into naphthenate anions by the amine solvent; the extreme heating (e.g., high temperature steam) is replaced by gentle heating because the amine solvent appreciably reduces the viscosity, density and surface tension of the heavy oil-in-water emulsion; and aluminosilicate and silica minerals in the formation are stabilized, rather than destabilized (steam, or a strong inorganic base, and combinations thereof), by the protonated amine solvent as a conjugated weak acid. As such, the emulsification can be attained by mixing the amine solvent with a hot de-scaled saline stream or low grade steam and injecting the mixture into the geo-formation to economically and efficiently extract heavy oil as an oil-in-water emulsion. The emulsification of heavy oil in water may be applied: (1) at a temperature of about 70° C. to 160° C. (or a higher temperature if required); and (2) to vertically oriented oil wells, or horizontally oriented oil wells, and combinations thereof. The extracted oil-in-water emulsion from the formation (underground) to the surface (above ground) is then de-emulsified and subjected to oil-water phase separation as essentially described in Paragraphs [0077], [0079], [0081], and The embodiment is also directly applicable in water flooding, especially when natural downhole formation temperatures are within 70-95° C.

In my allowed U.S. patent application Ser. Nos. 16/873, 362 and 16/873,373, a multi-effect distillation train comprises a backward feed mode produces both distillate and hot de-scaled brine. Adjusting the salinity of the injected fluid becomes doable between the distillate or the produced low grade steam of the distillate on the one hand; and the hot de-scaled brine, on the other hand. Using the hot de-scaled brine directly with an amine solvent may very well be useful.

What is claimed is:

1. A method of recycling a waste material of a thermoplastic polymer, said method comprising the steps of: (a) hydrating said waste material of said thermoplastic polymer and emulsifying the hydrated waste material of the thermoplastic polymer by an amine solvent to form a first oil-in-water emulsion and a primary structure of said thermoplastic polymer; (b) separating said primary structure of said thermoplastic polymer from said first oil-in-water emulsion; thereby forming a second oil-in-water emulsion; (c) separating said amine solvent from said second oil-in-water emulsion; thereby forming a broken oil-in-water emulsion; and (d) separating said broken oil-in-water emulsion into an oil phase and a water phase.

2. The method of claim 1, wherein said waste material comprises a plasticizer, or a heat stabilizer, and combinations thereof; wherein said plasticizer comprises heavier aromatic hydrocarbons; and wherein said heat stabilizer comprises heavier aliphatic hydrocarbons.

3. The method of claim 1, wherein said thermoplastic polymer is a homopolymer of vinyl chloride or a co-polymer of vinyl chloride; wherein said co-polymer is selected from the group consisting of ethylene, propylene, vinyl acetate, vinyl alcohols, vinyl ethers, vinylidene chloride, acryonitrile, or acrylic esters, and combinations thereof.

4. The method of claim 1, wherein said amine solvent is selected from the group consisting of methylamine, ethyl-

TABLE 1

Relevant Properties of the Selected Solvents.

| Solvent | $\sigma_L$ (mN/m) | $\rho$ (g/cm³) | $\mu$ | $\varepsilon$ (cp) | DP (debye) | $\omega$ | $T_C$ (° C.) | $p_C$ (bar) |
|---|---|---|---|---|---|---|---|---|
| Water | 71.9 | 0.998 | 0.76 | 78.3 | 1.8 | 0.344 | 374.15 | 221.2 |
| MA | 19.2 | 0.703 | 0.19 | 10.0 | 1.29 | 0.292 | 156.85 | 75.3 |
| DMA | 26.3 | 0.656 | 0.21 | 5.26 | 1.14 | 0.302 | 164.55 | 53.8 |
| TMA | 13.4 | 0.633 | 0.32 | 2.40 | 0.60 | 0.195 | 160.05 | 40.7 |
| EA | 19.1 | 0.683 | 0.24 | 6.94 | 1.40 | 0.289 | 183.25 | 56.4 |
| DEA | 19.9 | 0.707 | 0.33 | 3.60 | 1.11 | 0.291 | 223.35 | 37.6 |
| TEA | 20.2 | 0.728 | 0.34 | 2.42 | 0.90 | 0.329 | 261.85 | 30.4 |
| IPA | 17.5 | 0.688 | 0.36 | 5.45 | 1.45 | 0.291 | 198.65 | 45.4 |
| PA | 21.8 | 0.717 | 0.34 | 5.31 | 1.36 | 0.303 | 223.85 | 48.7 |
| DIPA | 19.1 | 0.717 | 0.40 |  | 1.26 | 0.360 | 249.95 | 30.6 |
| DPA | 22.3 | 0.738 | 0.50 | 3.07 | 1.03 | 0.471 | 282.65 | 30.3 |
| TPA | 22.4 | 0.753 |  |  | 0.76 |  |  |  |

MA: $CH_5N$;
DMA: $C_2H_7N$;
TMA: $C_3H_9N$;
EA: $C_2H_7N$;
DEA: $C_4H_{11}N$;
TEA: $C_6H_{15}N$;
IPA: $C_3H_9N$;
PA: $C_3H_9N$;
DIPA: $C_6H_{15}N$;
DPA: $C_6H_{15}N$; and
TPA: $C_9H_{21}N$.
$\sigma_L$: Surface Tension at 25°C.;
$\rho$: Density;
$\mu$: Viscosity;
$\varepsilon$: Dielectric Constant;
DP: Dipole Moment at 25°C.;
$\omega$: Acentric Factor;
$T_C$: Critical Temperature; and
$p_C$: Critical Pressure.

amine, isopropylamine, propylamine, dimethylamine, diethylamine, diisopropylamine, dipropylamine, trimethylamine, triethylamine, tripropylamine, and combinations thereof.

5. The method of claim 1, wherein said step (a) is conducted at a temperature of 90° C. to 200° C.

6. The method of claim 1, wherein said step (c) is conducted using an inert gas; wherein said inert gas is selected from the group consisting of nitrogen, water vapor, and combinations thereof.

7. The method of claim 1, wherein step (d) is conducted using a hydrophobic membrane to separate said oil phase from said water phase.

8. The method of claim 1, further comprising the steps of: (a) hydrating said primary structure of said thermoplastic polymer and de-chlorinating the hydrated primary structure of the thermoplastic polymer by said amine solvent at a temperature of 210° C. to 300° C. to release hydrogen chloride, scavenge the released hydrogen chloride, and form a secondary structure of said thermoplastic polymer comprising polyene; (b) separating said amine solvent and converting the scavenged hydrogen chloride into a water-soluble chloride-salt by an inorganic base; wherein said inorganic base is selected from the group consisting of calcium hydroxide, sodium hydroxide, or potassium hydroxide, and combinations thereof; and (c) separating said secondary structure of said thermoplastic polymer from said water-soluble chloride-salt.

9. The method of claim 1, further comprising the steps of: (a) hydrating said primary structure of said thermoplastic polymer and de-chlorinating the hydrated primary structure of the thermoplastic polymer by calcium hydroxide or a mixture of calcium hydroxide and sodium hydroxide at a temperature of 210° C. to 300° C. to release hydrogen chloride and convert the released hydrogen chloride into a water-soluble chloride-salt, thereby forming a secondary structure of said thermoplastic polymer comprising polyene; and (b) separating said secondary structure of said thermoplastic polymer from said water-soluble chloride-salt.

10. A method of treating of a thermoplastic polymer, said method comprising the steps of: (a) hydrating said thermoplastic polymer and de-chlorinating the hydrated thermoplastic polymer by an amine solvent to release hydrogen chloride and to scavenge the released hydrogen chloride, thereby forming a secondary structure of said thermoplastic polymer comprising polyene; (b) separating said amine solvent and converting the scavenged hydrogen chloride into a water-soluble chloride-salt by an inorganic base; and (c) separating said secondary structure of said thermoplastic polymer from said water-soluble chloride-salt.

11. The method of claim 10, wherein said thermoplastic polymer is a homopolymer of vinyl chloride or a co-polymer of vinyl chloride; wherein said co-polymer is selected from the group consisting of ethylene, propylene, vinyl acetate, vinyl alcohols, vinyl ethers, vinylidene chloride, acryonitrile, or acrylic esters, and combinations thereof.

12. The method of claim 10, wherein said amine solvent is selected from the group consisting of methylamine, ethylamine, isopropylamine, propylamine, dimethylamine, diethylamine, diisopropylamine, dipropylamine, trimethylamine, triethylamine, tripropylamine, and combinations thereof.

13. The method of claim 10, wherein said step (a) is conducted at a temperature of 210° C. to 300° C.

14. The method of claim 10, wherein said inorganic base is selected from the group consisting of calcium hydroxide, sodium hydroxide, or potassium hydroxide, and combinations thereof.

15. The method of claim 10, further comprising the step of hydrating said thermoplastic polymer and chlorinating the hydrated thermoplastic polymer by a chlorine source and said amine solvent at a temperature of 80° C. to 120° C. to enable chlorine to effuse through and dissolve in said thermoplastic polymer; thereby producing a chlorinated thermoplastic polymer; and wherein said chorine source is selected from the group consisting of chlorine gas, sodium hypochlorite, or calcium hypochlorite, and combinations thereof.

16. A method of recovering heavy hydrocarbons from geo-formation and stabilizing said geo-formation, said method comprising the steps of: (a) mixing an amine solvent with a hot de-scaled saline stream or low grade steam, and injecting the mixture into said geo-formation to convert the naturally present naphthenic acids of said heavy hydrocarbons into naphthenate anions, thereby forming an oil-in-water emulsion; (b) separating said amine solvent from said oil-in-water emulsion; thereby forming a broken oil-in-water emulsion; and (c) separating said broken oil-in-water emulsion into an oil phase and a water phase.

17. The method of claim 16, wherein said amine solvent is selected from the group consisting of methylamine, ethylamine, isopropylamine, propylamine, dimethylamine, diethylamine, diisopropylamine, dipropylamine, trimethylamine, triethylamine, tripropylamine, and combinations thereof.

18. The method of claim 16, wherein said step (a) is conducted at a temperature of 70° C. to 160° C.

19. The method of claim 16, wherein said step (b) is conducted using an inert gas; wherein said inert gas is selected from the group consisting of nitrogen, water vapor, and combinations thereof.

20. The method of claim 16, wherein step (c) is conducted using a hydrophobic membrane to separate said oil phase from said water phase.

* * * * *